US012688770B2

(12) United States Patent
Qu et al.

(10) Patent No.: US 12,688,770 B2
(45) Date of Patent: Jul. 21, 2026

(54) METHODS FOR WIRELESS SENSING IN INTEGRATED SENSING AND COMMUNICATIONS SYSTEM

(71) Applicant: MediaTek Singapore Pte. Ltd., Singapore (SG)

(72) Inventors: Wenze Qu, Beijing (CN); Fei Xu, Beijing (CN); Yaochao Liu, Beijing (CN); Min Lei, Beijing (CN); Tao Chen, Beijing (CN); Shiauhe Tsai, San Jose, CA (US); Haoran Li, Beijing (CN); Xuanbo Shao, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 19 days.

(21) Appl. No.: 18/822,011

(22) Filed: Aug. 30, 2024

(65) Prior Publication Data

US 2025/0087080 A1 Mar. 13, 2025

(51) Int. Cl.
*G08C 17/02* (2006.01)

(52) U.S. Cl.
CPC .................................... *G08C 17/02* (2013.01)

(58) Field of Classification Search
CPC ...................................................... G08C 17/02
See application file for complete search history.

(56) References Cited

U.S. PATENT DOCUMENTS

2023/0155663 A1* 5/2023 Li ........................... G01S 7/006
342/52
2024/0007167 A1* 1/2024 Wu ...................... H04B 7/0696
2025/0035736 A1* 1/2025 Hu .......................... G01S 13/42
2025/0260464 A1* 8/2025 Huang ................. H04B 7/0695
2025/0274861 A1* 8/2025 Zhang ..................... G01S 7/006

* cited by examiner

*Primary Examiner* — Patrick N Edouard
*Assistant Examiner* — Eboni N Giles
(74) *Attorney, Agent, or Firm* — Andy M. Han; Han IP PLLC

(57) ABSTRACT

Various solutions for wireless sensing in integrated sensing and communications (ISAC) system are described. An apparatus (e.g., a receiver node) may receive one or more first reference signals (RSs) based on a first sensing RS configuration, and perform a sensing of a target object based on the first RSs. Then, the apparatus may receive one or more second RSs based on a second sensing RS configuration. The second sensing RS configuration is determined by the apparatus or is received from another apparatus in an event that at least one of a sensing requirement and a channel condition is changed. The apparatus may further perform the sensing of the target object based on the second RSs.

16 Claims, 22 Drawing Sheets

1700

METHODS FOR WIRELESS SENSING IN INTEGRATED SENSING AND COMMUNICATIONS SYSTEM

CROSS REFERENCE TO RELATED PATENT APPLICATION(S)

The present disclosure is part of a non-provisional application claiming the priority benefit of PCT Application No. PCT/CN2023/118345, filed 12 Sep. 2023, and CN application No. 202411048827.X, filed 31 Jul. 2024. The contents of aforementioned applications are herein incorporated by reference in their entirety.

TECHNICAL FIELD

The present disclosure is generally related to mobile communications and, more particularly, to wireless sensing in integrated sensing and communications (ISAC) system.

BACKGROUND

Unless otherwise indicated herein, approaches described in this section are not prior art to the claims listed below and are not admitted as prior art by inclusion in this section.

Mobile communication and radar sensing have been advancing independently for decades. Until recently, the coexistence, cooperation, and joint design of the two systems becomes of interest. Motivation for such a topic may include that the use of millimeter waves in $5^{th}$ generation (5G) and beyond leads to an occupation of adjacent frequency bands, which makes the convergence of the frequency bands used by two systems possible. In addition, with the increasing use of radar sensing in consumer devices and automotive applications, radar systems have entered mass markets. Given that jointly handling communications and sensing on the same architecture or platform would be more cost effective and have lower complexity as compared to two independent platforms, the concept of joint communication and sensing (or called ISAC) is introduced and the beyond 5G (B5G) or $6^{th}$ Generation (6G) system is envisioned to support sensing service within communication framework.

As the topic is still under study, the new design of air interface for ISAC is not yet defined. For example, how to design procedures for sensing signal configuration or scheduling, sensing resource allocation, and sensing with beam management has become an important issue for the newly developed ISAC system. Therefore, there is a need to provide proper schemes to address this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issue pertaining to wireless sensing in the ISAC system.

In one aspect, a method may involve an apparatus (e.g., a receiver node) receiving one or more first reference signals (RSs) based on a first sensing RS configuration. The method may also involve the apparatus performing a sensing of a target object based on the first RSs. The method may further involve the apparatus receiving one or more second RSs based on a second sensing RS configuration. The second sensing RS configuration is determined by the apparatus or is received from another apparatus in an event that at least one of a sensing requirement and a channel condition is changed. The method may further involve the apparatus performing the sensing of the target object based on the second RSs.

In one aspect, a method may involve an apparatus (e.g., a transmitter node) transmitting one or more first RSs associated with a first sensing RS configuration for a sensing of a target object. The method may also involve the apparatus transmitting one or more second RSs associated with a second sensing RS configuration for the sensing of the target object. The second sensing RS configuration is determined by the apparatus or is transmitted to another apparatus in an event that at least one of a sensing requirement and a channel condition is changed.

In one aspect, an apparatus may comprise a transceiver which, during operation, wirelessly transmits and receives signals. The apparatus may also comprise a processor communicatively coupled to the transceiver. The processor, during operation, may perform operations comprising receiving, via the transceiver, one or more first RSs based on a first sensing RS configuration. The processor may also perform operations comprising performing a sensing of a target object based on the first RSs. The processor may further perform operations comprising receiving, via the transceiver, one or more second RSs based on a second sensing RS configuration. The processor may further perform operations comprising performing the sensing of the target object based on the second RSs.

It is noteworthy that, although description provided herein may be in the context of certain radio access technologies (RATs), networks and network topologies such as Long-Term Evolution (LTE), LTE-Advanced, LTE-Advanced Pro, 5G, New Radio (NR), Internet-of-Things (IoT) and Narrow Band Internet of Things (NB-IoT), Industrial Internet of Things (IIoT), beyond 5G (B5G), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to wireless sensing in ISAC system. According to the present disclosure, a number of possible solutions may be implemented separately or jointly. That is, although these possible solutions may be described below separately, two or more of these possible solutions may be implemented in one combination or another.

Figure 1:
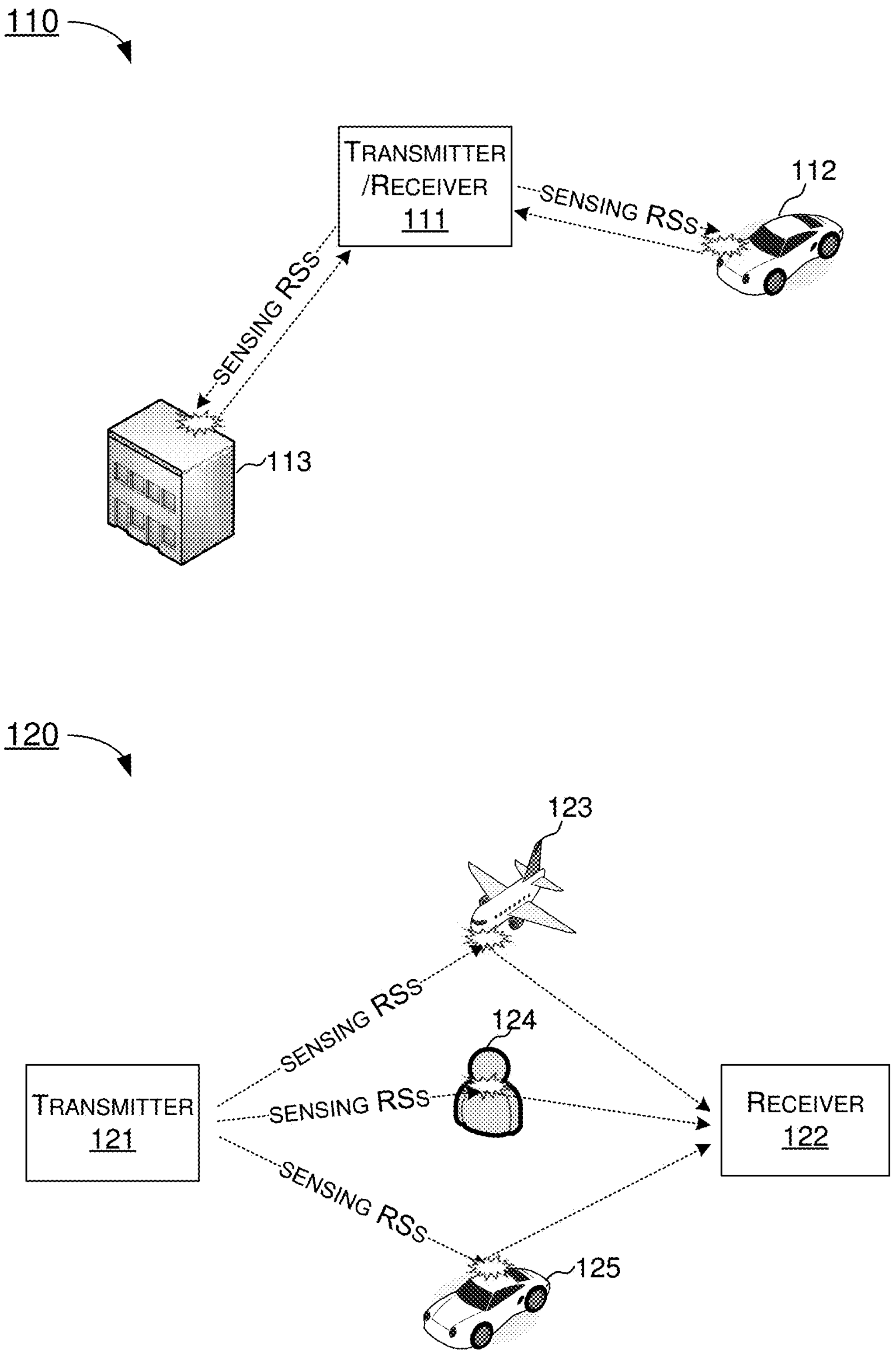
FIG. 1 is a diagram depicting example scenarios of a communication environment in which various solutions and schemes in accordance with the present disclosure may be implemented.

FIG. 1 illustrates example scenarios 110 and 120 of a communication environment in which various solutions and schemes in accordance with the present disclosure may be implemented. Scenario 110 involves a transmitter/receiver 111 and one or more target objects (or called targets) 112 and 113, wherein the transmitter/receiver 111 supports monostatic sensing for any of the target objects 112 and 113. In monostatic sensing, the transmitter unit and receiver unit are generally co-located (e.g., within a single device) (or connected with fiber and act as distributed monostatic system), and thus share complete knowledge of the transmitted signals and the clock. On the other hand, scenario 120 involves a transmitter 121, a receiver 122, and one or more target objects 123 to 125, wherein the transmitter 121 and the receiver 122 supports bistatic sensing for any of the target objects 123 to 125. In bistatic sensing, the transmitter 121 and the receiver 122 are usually at different locations, where the receiver 122 may only have partial knowledge of the transmitted signals and certain synchronization (e.g., clock synchronization) between the transmitter 122 and the receiver 122 may be required. Each of the transmitter/receiver 111, the transmitter 121, and the receiver 122 may function as a user equipment (UE) or a base station (BS). In one example, the transmitter 121 may be a BS and the receiver 122 may be a UE, or the transmitter 121 may be a UE and the receiver 122 may be a BS. In another example, the transmitter 121 and the receiver 122 may be two BSs or two UEs. The UE may include a smartphone, a smartwatch, a personal digital assistant, a digital camera, a tablet computer, a laptop computer, a notebook computer, or an IoT/NB-IoT/IIoT apparatus. The BS may include an evolved NodeB (eNB) in 4G LTE, a next-generation NB (gNB) or a transmission and reception point (TRP) in 5G NR, or a B5G/6G NB. In such a communication environment, the transmitter/receiver 111, or the transmitter 121 and the receiver 122 may implement various schemes pertaining to wireless sensing in ISAC system in accordance with the present disclosure, as described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Under certain schemes in accordance with the present disclosure, two types of sensing procedures (including a single-stage sensing procedure and a multiple-stage sensing procedure) are proposed for different sensing use cases, such that Tx configurations and Rx operations may be adaptively adjusted to the change of sensing requirement(s) and/or channel condition(s) during the sensing service.

Specifically, sensing use cases may be classified into the following four scenarios: (i) periodically detecting targets within specified range for a long time, and estimating related information of targets simultaneously (e.g., intrusion detection, unmanned aerial vehicle (UAV)/car/pedestrian monitor and counting); (ii) with approximate location of target being given, periodically estimating related information of target for a long time (e.g., respiration detection); (iii) detecting targets through a large range scanning, and then tracking the targets and/or making high precision estimation (e.g., target detection and tracking, high precision estimation (of range/velocity/angle); (iv) with approximate location of target being given, making high precision estimation for a long/short time (e.g., gesture recognition). In one example, the single-stage sensing procedure may be applied for the first and second scenarios (e.g., periodic target detection or monitoring), since only one kind of sensing operation is required for the sensing service. In another example, the multiple-stage sensing procedure may be applied for the third and fourth scenarios (e.g., periodic target detection or monitoring and aperiodic target refining or tracking), since multiple kinds of sensing operations, each corresponding to a stage, are required for the sensing service. Additionally, or optionally, link adaptation may be supported in the single-stage sensing procedure and/or the multi-stage sensing procedure, i.e., Tx configurations and Rx operations may be adjusted to the change of sensing requirement(s) and/or channel condition(s) during the single/multi-stage sensing procedure.

During the sensing service, sensing requirement(s) and/or channel condition(s) may be changed (e.g., due to change of sensing purpose). For example, the sensing purpose may change from target detection (e.g., in the first stage of the multi-stage sensing procedure) to target tracking or target refining (e.g., in the second stage of the multi-stage sensing procedure). In such case, exhaustive (coarse) beam sweeping may be used for target detection in the first stage to cover the whole sensing area, and fewer (fine) beams may be used in the second stage based on the sensing results (e.g., the rough sensing target location) of the first stage, which may benefit resource utilization and reduce complexity. Another example is about link adaptation, i.e., when channel condition is changed, sensing RS may need to be reconfigured (e.g., in terms of RS pattern, bandwidth (BW), Tx beam number, or beam direction, etc.) to ensure sensing quality.

Specifically, the sensing requirement(s) and channel condition(s) may include at least one of the following: sensing service type, sensing performance requirements, channel condition, sensing resource constrain, transceiver complexity constrain, etc. The Tx configuration of sensing RS may change responsive to the change of sensing requirement(s) and channel condition(s), and the Rx operations corresponding to the Tx configuration may also change. Tx configuration change may include changes in at least one of the following: sensing RS pattern (i.e., time and frequency domain pattern, sequence), symbol number and interval (within cyclic prefix interval (CPI)), RS period, sub-carrier spacing (SCS), BW, power per resource element (RE), Tx beam width, Tx beam number, and Tx beam direction. Rx operation change may include changes in at least one of the following: sensing algorithms (e.g., two-dimensional fast Fourier transform (2D-FFT), multiple signal classification (MUSIC), and other sensing algorithms) corresponding to different Tx configurations, Rx beam width, Rx beam number, and Rx beam direction.

The change of sensing RS configuration may be realized by RRC reconfiguration or by activating/indicating new sensing RS (e.g., through RRC signaling, medium access control-control element (MAC-CE), or downlink control information (DCI)). Alternatively, similar to using physical downlink control channel (PDCCH) to indicate the configuration of physical downlink shared channel (PDSCH), DCI may be used to directly adjust/change the sensing RS configuration.

Figure 2:
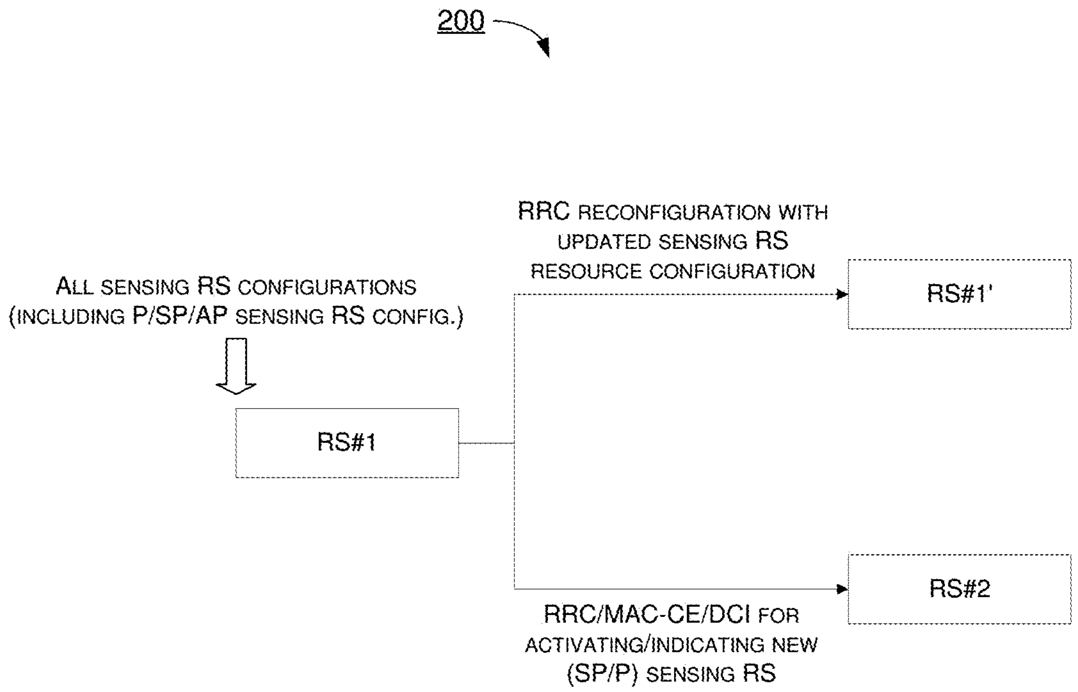
FIG. 2 is a diagram depicting an example scenario of sensing RS (re) configuration for single-stage sensing and multiple-stage sensing in accordance with an implementation of the present disclosure.

FIG. 2 illustrates an example scenario 200 of sensing RS (re) configuration for single-stage sensing and multiple-stage sensing in accordance with an implementation of the present disclosure. Scenario 200 depicts sensing RS (re) configuration and scheduling for different sensing use cases. In the beginning, all sensing RS are configured (denoted as sensing RS #1), including periodic (P), semi-persistent (SP) and aperiodic (AP) sensing RSs. Next, during the ongoing sensing service, the sensing RS may be reconfigured (e.g., with updated resource configuration) (denoted as RS #1') for link adaptation by RRC reconfiguration. In one example for single-stage sensing, RS #1 may be used for periodic sensing, and then RS #1 may be reconfigured as RS #1' for link adaptation and remain used for the same sensing purpose (i.e., periodic sensing). Alternatively, new (P/SP/AP) sensing RS (denoted as RS #2) may be activated or indicated by RRC, MAC-CE, or DCI for new sensing purpose. In one example for multi-stage sensing, RS #1 may be used for periodic sensing, and then RS #1 may be reconfigured as RS #1' or RS #2 may be activated/indicated (via RRC/MAC-CE/DCI) for a different sensing purpose, or RS #2 may be activated or indicated by for new sensing purpose.

Figure 3:
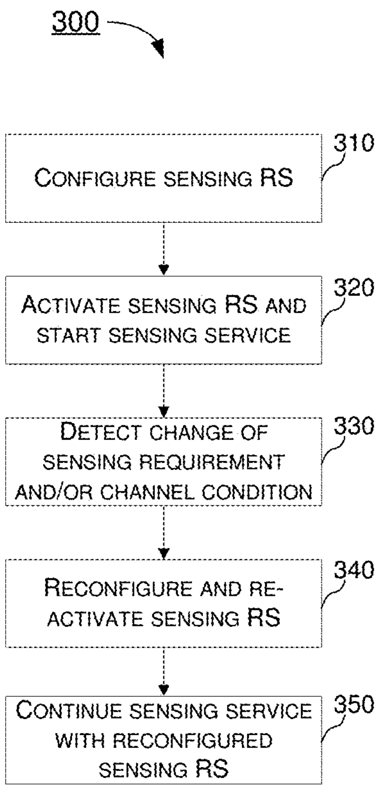
FIG. 3 is a diagram depicting an example flowchart of a single-stage sensing procedure in accordance with an implementation of the present disclosure.

FIG. 3 illustrates an example flowchart 300 of a single-stage sensing procedure in accordance with an implementation of the present disclosure. To begin with, at step 310, the transmitter may transmit the sensing RS configuration to the receiver, e.g., through RRC signaling, and the receiver may configure the sensing RS(s) based on the received sensing RS configuration. At step 320, the transmitter may activate certain sensing RS(s) to the receiver, e.g., through RRC signaling, MAC-CE, or DCI, and start sensing service, while the receiver may activate the sensing RS(s) and start sensing service as well. At step 330, the transmitter may detect change(s) of the sensing requirement(s) and/or the channel condition(s) is/are changed. At step 340, in response to the detected change, the transmitter may transmit updated sensing RS configuration to the receiver, e.g., through RRC signaling, and re-activate the sensing RS(s) to the receiver, e.g., through RRC signaling, MAC-CE, or DCI, while the receiver may reconfigure and re-activate the sensing RS(s) based on the updated sensing RS configuration. At step 350, both the transmitter and the receiver may continue the sensing service with the reconfigured sensing RS(s), and the receiver may make corresponding changes to the Rx operations.

Figure 4:
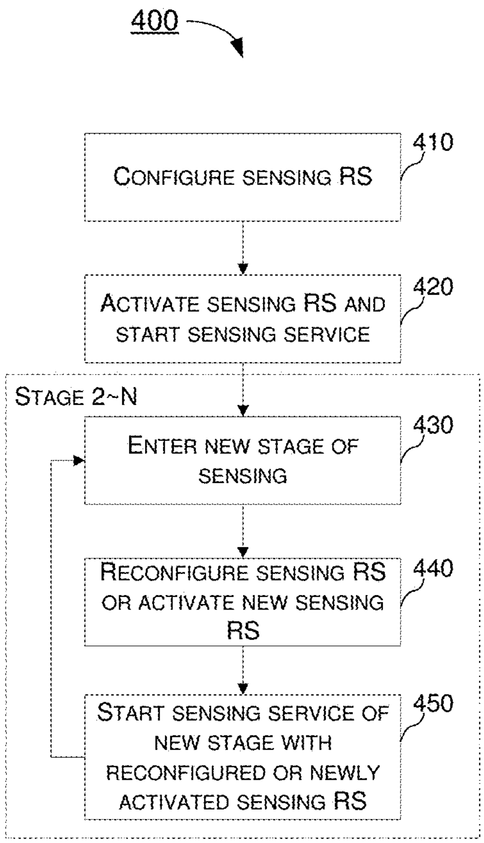
FIG. 4 is a diagram depicting an example flowchart of a multi-stage sensing procedure in accordance with an implementation of the present disclosure.

FIG. 4 illustrates an example flowchart 400 of a multi-stage sensing procedure in accordance with an implementation of the present disclosure. Similar to steps 310 and 320 of FIG. 3, at steps 410 and 420, the sensing RS(s) is configured and activated to start sensing service in stage 1. At step 430, the transmitter and/or the receiver enters a new stage (e.g., stage 2~N) corresponding to new sensing requirement(s). At step 440, in response to entering new stage, the transmitter may transmit updated sensing RS configuration to the receiver, e.g., through RRC signaling, or activate new sensing RS(s) to the receiver, e.g., through RRC signaling, MAC-CE, or DCI, while the receiver may reconfigure the sensing RS(s) or activate new sensing RS(s) based on the received sensing RS configuration. At step 450, both the transmitter and the receiver may start the sensing service of the new stage with the reconfigured or newly activated sensing RS(s), and the receiver may make corresponding changes to the Rx operations.

Under certain schemes in accordance with the present disclosure, sensing RS resource allocations for ISAC system are proposed, such that coexistence between sensing RS and communication signals can be realized. Specifically, sensing RS may be time-division multiplexed (TDMed) and/or frequency-division multiplexed (FDMed) with communication signals. Additionally, or optionally, sensing RS for different sensing stage (e.g., of multi-stage sensing) may also be TDMed and/or FDMed.

Several types of sensing RS resource allocation are to be described below. Assume periodic sensing RS for single-stage sensing and stage 1 of multi-stage sensing, and aperiodic sensing RS for other stages of multi-stage sensing in the following examples, but it should be noted that these types of sensing RS resource allocation can be applied for P/SP/AP sensing RS.

Figure 5:
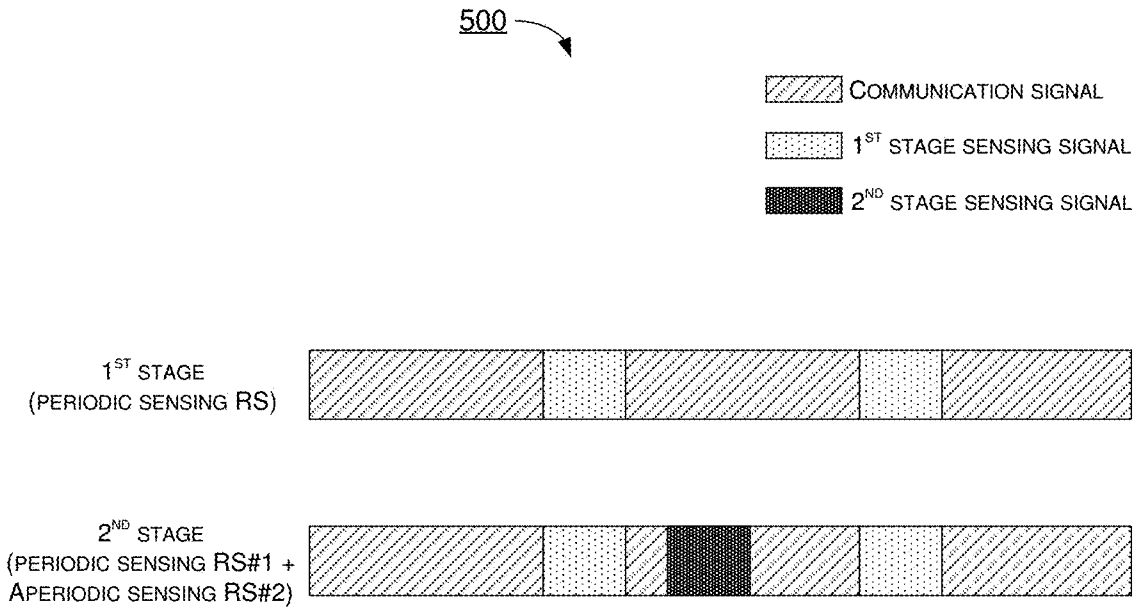
FIG. 5 is a diagram depicting an example scenario of a sensing RS resource allocation in accordance with an implementation of the present disclosure.

FIG. 5 illustrates an example scenario 500 of a sensing RS resource allocation in accordance with an implementation of the present disclosure. Scenario 500 depicts type 1 of sensing RS resource allocation, wherein the sensing RS is TDMed with communication signals during single-stage sensing or stage 1 of multi-stage sensing, and the sensing RS for the first sensing stage is TDMed with the sensing RS for the second sensing stage.

Figure 6:
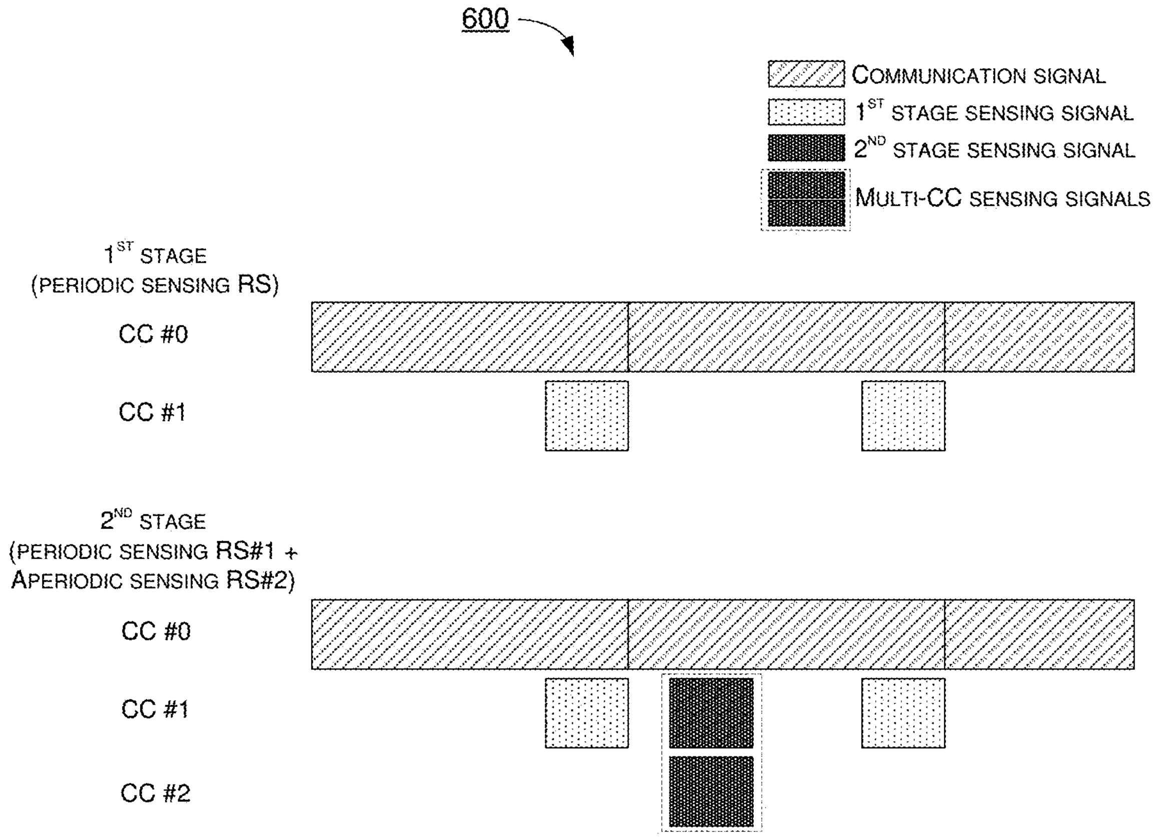
FIG. 6 is a diagram depicting an example scenario of a sensing RS resource allocation in accordance with another implementation of the present disclosure.

FIG. 6 illustrates an example scenario 600 of a sensing RS resource allocation in accordance with another implementation of the present disclosure. Scenario 600 depicts type 2 of sensing RS resource allocation, wherein the sensing RS is FDMed with communication signals during single-stage sensing or stage 1 of multi-stage sensing, and the sensing RS for the first sensing stage is TDMed and FDMed with the sensing RSs for the second sensing stage. In particular, the sensing RSs for the second sensing stage are allocated on multiple component carriers (CCs) for multi-CC sensing. Additionally, or optionally, BM operations on common CC and sensing CC may be different, and separate BM operations on these two CCs may be required.

Figure 7:
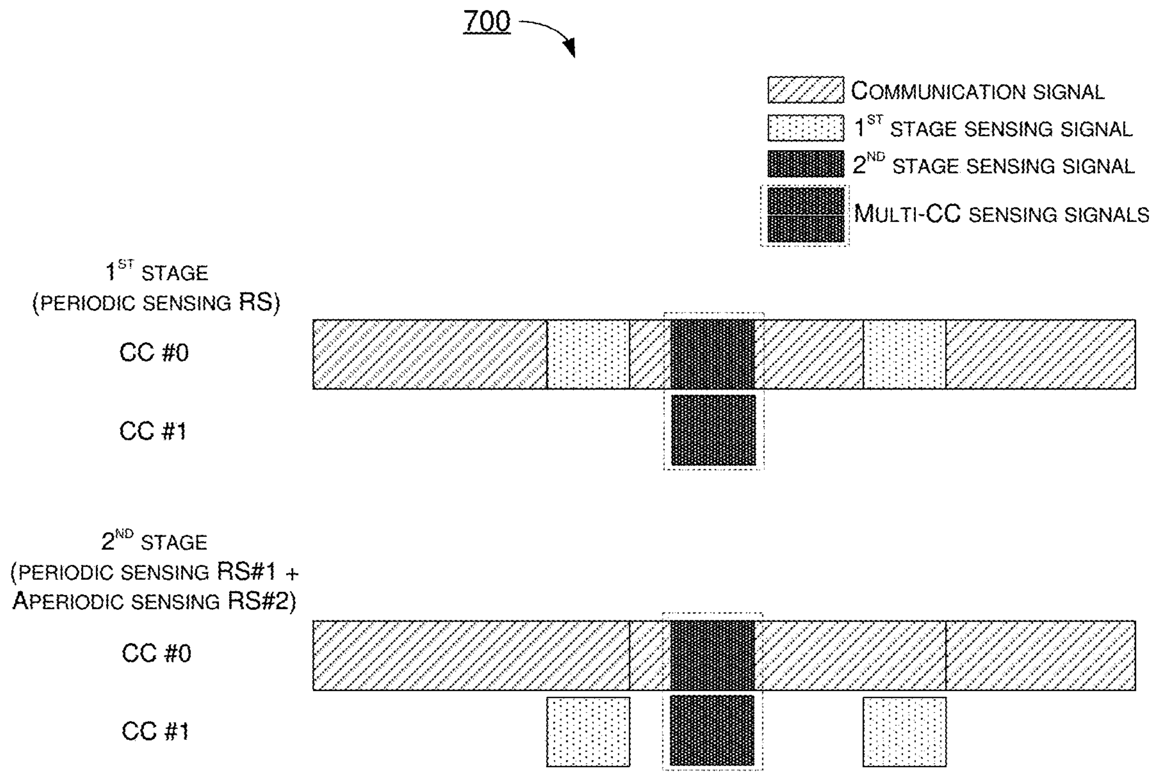
FIG. 7 is a diagram depicting an example scenario of a sensing RS resource allocation in accordance with another implementation of the present disclosure.

FIG. 7 illustrates an example scenario 700 of a sensing RS resource allocation in accordance with another implementation of the present disclosure. Scenario 700 depicts type 3 of sensing RS resource allocation, wherein the sensing RS is TDMed and FDMed with communication signals during single-stage sensing or stage 1 of multi-stage sensing, and the sensing RS for the first sensing stage is TDMed and FDMed with the sensing RS for the second sensing stage of multi-stage sensing. In particular, the sensing RSs for the second sensing stage are allocated on multiple CCs for multi-CC sensing.

Figure 8:
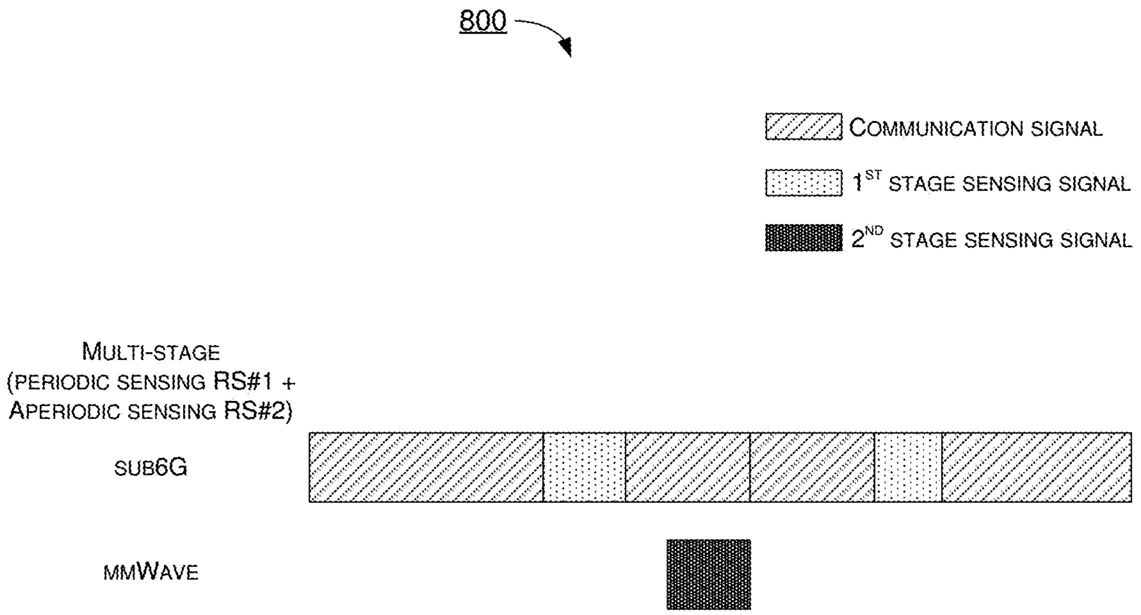
FIG. 8 is a diagram depicting an example scenario of a sensing RS resource allocation in accordance with another implementation of the present disclosure.

FIG. 8 illustrates an example scenario 800 of a sensing RS resource allocation in accordance with another implementation of the present disclosure. Scenario 800 depicts type 4 of sensing RS resource allocation, wherein the sensing RS for the first sensing stage is TDMed with communication signals on sub6G (i.e., frequency range 1 (FR1)), and the sensing RS for the first sensing stage is FDMed with the sensing RS for the second sensing stage. In particular, the sensing RSs for the second sensing stage are allocated on mmWave (i.e., frequency range 2 (FR2)).

As for sensing, introducing beam management not only provides Tx and Rx beamforming gain, but also allows scanning target within three-dimensional (3D) region of sensing area through Tx and Rx beam sweeping. As such, under certain schemes in accordance with the present disclosure, "baseline BM procedure" for general sensing BM operations and "low-cost BM procedure" for enhanced BM operations are proposed, so that sensing resource utilization and computational complexity may be efficiently reduced.

In general, sensing RSs may be configured with one or multiple Tx beams to cover the whole sensing area. Configurations of Tx beam number, beamwidth, and beam direction may depend on the used frequency band (e.g., sub6G, mmWave), sensing area, and/or required beamforming gain, etc. Configurations of Rx beam number, beamwidth, and beam direction may depend on the used frequency band (e.g., sub6G, mmWave), required beamforming gain, sensing accuracy requirement, and/or Rx device capability, etc. For baseline BM procedure (e.g., for the case of no prior information regarding correspondence between Tx beams and Rx beams), the receiver may perform Rx beam sweeping for each Tx beam used at the transmitter, and perform sensing operation (e.g., using 2D-FFT, MUSIC or other sensing algorithms) simultaneously on all beam pair links (BPLs). Then, the sensing results on all BPLs may be integrated to determine the related information of the target.

Figure 9:
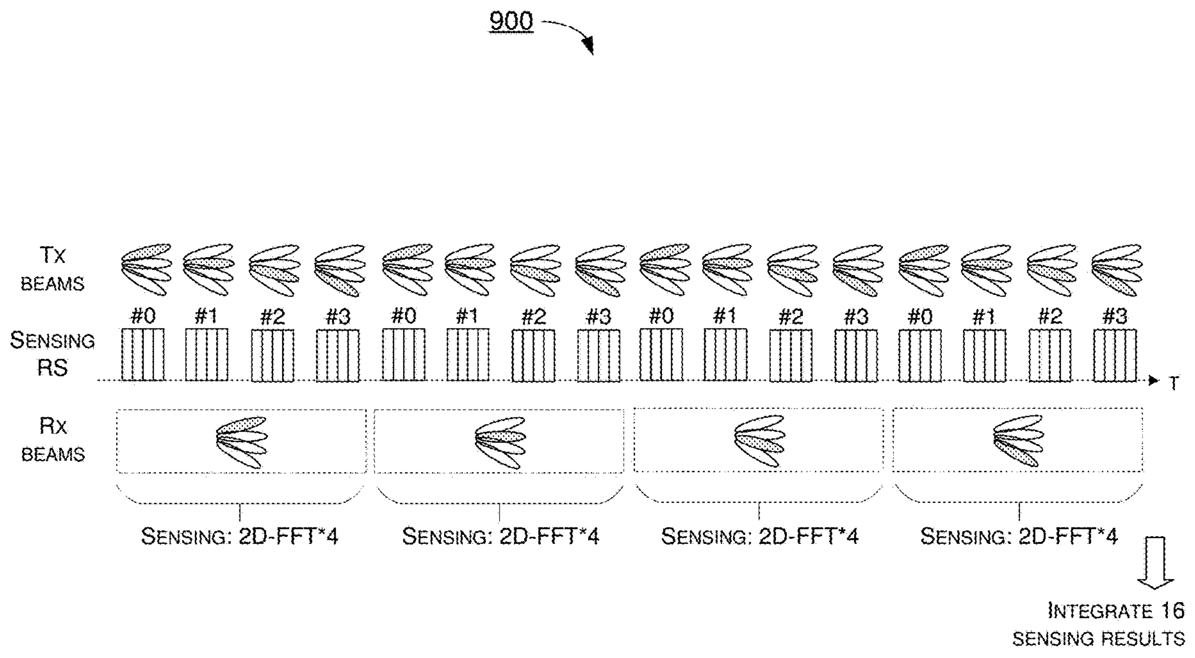
FIG. 9 is a diagram depicting an example scenario of a baseline beam management (BM) procedure for single-stage sensing in accordance with an implementation of the present disclosure.

FIG. 9 illustrates an example scenario 900 of a baseline BM procedure for single-stage sensing in accordance with an implementation of the present disclosure. Scenario 900 depicts a sensing service based on the periodic sensing RSs, each of which is associated with 4 Tx beams and allocated with 4 symbols for each Tx beam. In the receiver side, 4 Rx beams (beam-book based) are used for each Tx beam. That is, there are a total of 16 possible BPLs. During the sensing service, Tx beam sweeping for transmitting the sensing RS is performed with a shorter periodicity and Rx beam sweeping for receiving the sensing RS is performed with a longer periodicity, so that each Rx beam is able to receive the sensing RS transmitted on all Tx beams. Simultaneously, during the sensing service, sensing operations (e.g., using 2D-FFT) are performed on all 16 BPLs to obtain 16 sensing results which are integrated to determine the related information of the target based on certain integration algorithm.

Figure 10:
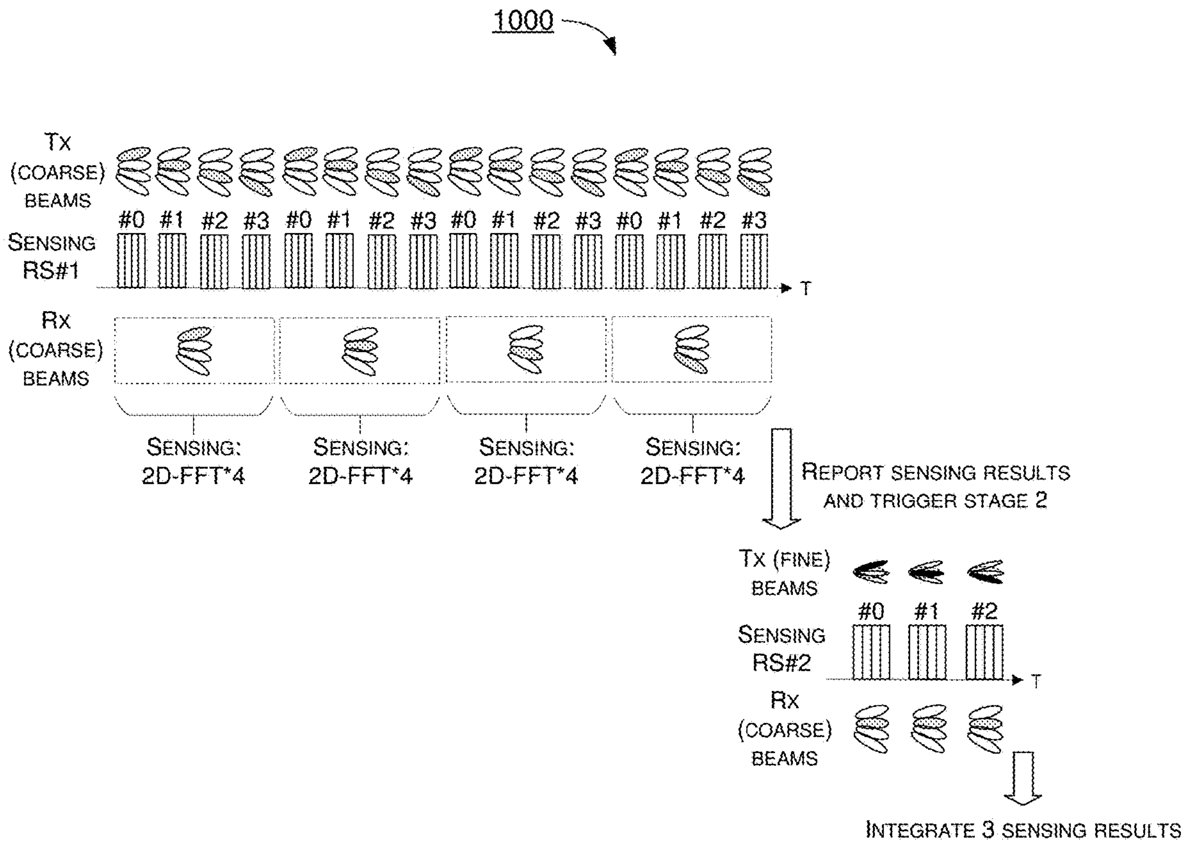
FIG. 10 is a diagram depicting an example scenario of a baseline BM procedure for multi-stage sensing in accordance with an implementation of the present disclosure.

FIG. 10 illustrates an example scenario 1000 of a baseline BM procedure for multi-stage sensing in accordance with an implementation of the present disclosure. Scenario 1000 depicts different sensing services for different sensing stages, wherein stage 1 is performed for target detection based on periodic sensing RS #1 and stage 2 is later performed for target tracking/refining based on aperiodic sensing RS #2. The BM operations and sensing operations in stage 1 are the same as those of the single-stage sensing described with respect to FIG. 9. In stage 2, the sensing RS #2 is associated with three fine Tx beams and has quasi co-location (QCL) relationship with BM RS #1 (e.g., Tx beam #1 of RS #1), and only one coarse Rx beam is used at the receiver side, which is corresponding to Tx beam #1 based on the sensing results of stage 1. Also, in stage 2, sensing operations (e.g., using 2D-FFT) are performed on three BPLs (i.e., 3 fine Tx beams times 1 coarse Rx beam) to obtain 3 sensing results which are integrated to determine the related information of the target.

As described above, for multi-stage sensing, the configurations of beam number, beamwidth, and beam direction of Tx beams and Rx beams may be different for different sensing stages. This is because the BM operation result from the previous stage may be useful in determining the Tx beam configurations and Rx beam settings for the next stage. For example, the sensing RS of a stage n (where n>1) may have QCL relationship with the sensing RS of previous stages (e.g., n−1, n−2, etc.), and/or the Rx beams used in stage n may be determined based on the BM operation result of previous stages (e.g., n−1, n−2, etc.). Various options of Tx beam and Rx beam settings for stage 2 are summarized below in Table 1, wherein option 1 is the case depicted in FIG. 10. It should be noted that, without loss of generality, the options in table 1 may also be applied for other stages (e.g., stage n, where n>2).

TABLE 1

| | Tx beam of sensing RS#2 | Rx beam | Purpose |
|---|---|---|---|
| Option 1 | m (m > 1, e.g., 3) fine Tx beams | 1 coarse Rx beam | Finer Tx beam |
| Option 2 | 1 coarse Tx beam | m (m > 1, e.g., 3) fine Rx beams | Finer Rx beam |
| Option 3 | m (m > 1, e.g., 3) fine Tx beams | m (m > 1, e.g., 3) fine Rx beams | Finer both Tx and Rx beam |
| Option 4 | 1 coarse Tx beam | 1 coarse Rx beam | Reduce Tx − Rx BPL number |

Figure 11:
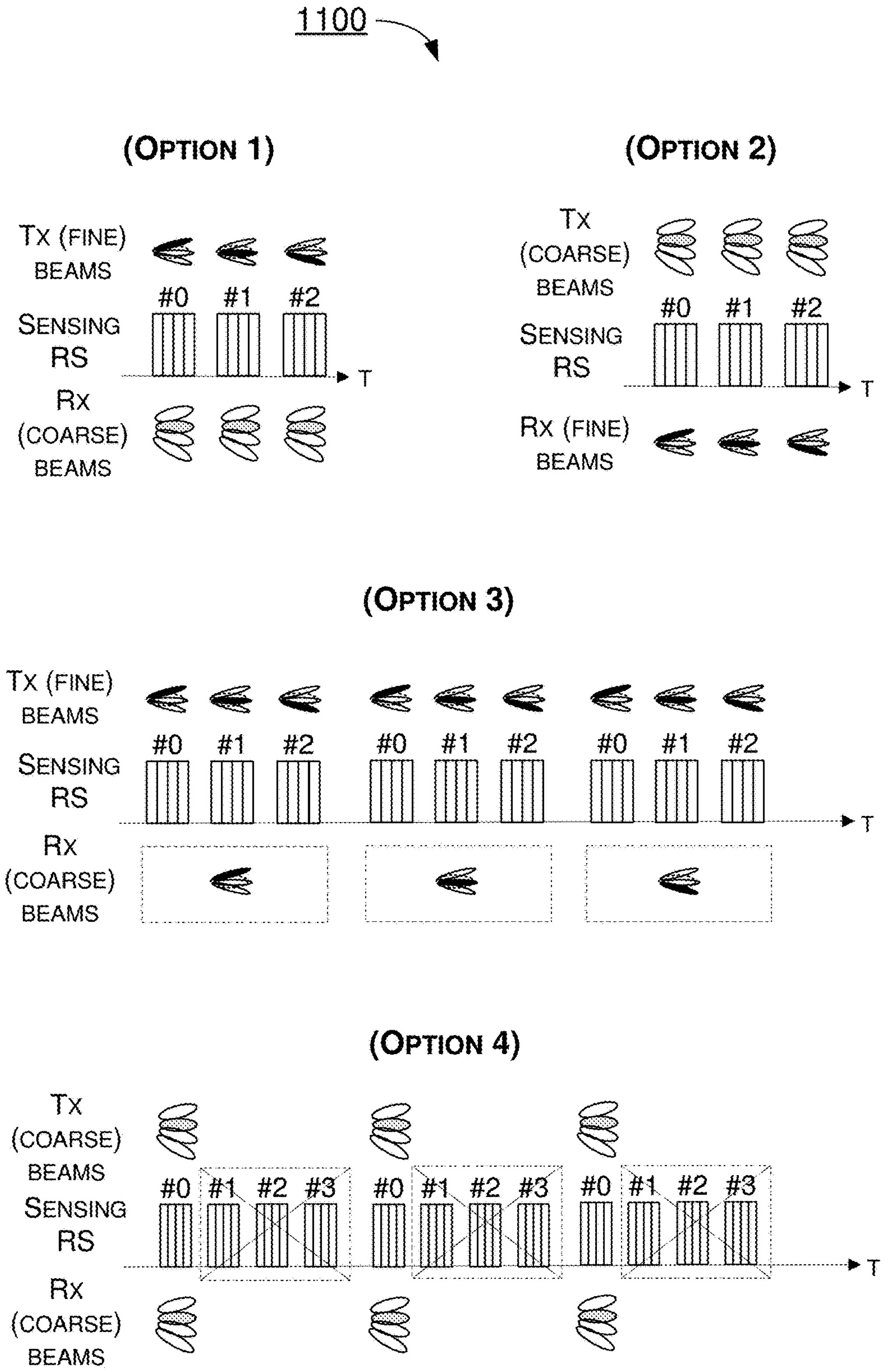
FIG. 11 is a diagram depicting an example scenario of various options of transmitting (Tx) beam and receiving (Rx) beam settings in accordance with an implementation of the present disclosure.

FIG. 11 illustrates an example scenario 1100 of various options of Tx beam and Rx beam settings as shown in Table 1 in accordance with an implementation of the present disclosure. Scenario 1100 depicts option 1 to option 4 from top to bottom. In option 1, finer beams are used only in the transmitter side, e.g., multiple (e.g., 3) fine Tx beams and one coarse Rx beam for stage-2 sensing. In option 2, finer beams are used only in the receiver side, e.g., one coarse Tx beam and multiple (e.g., 3) fine Rx beams for stage-2 sensing. In option 3, finer beams are used in both the transmitter side and the receiver side, e.g., multiple (e.g., 3) fine Tx beams and multiple (e.g., 3) fine Rx beams for stage-2 sensing. In option 4, only one coarse beam is used in each of the transmitter side and the receiver side, and thus, the number of BPLs used for stage-2 sensing can be reduced from 16 BPLs to 1 BPL that is selected based on the sensing results of stage 1, and sensing RS resource can be reduced as well since beam sweeping is not required.

It is noteworthy that the baseline BM procedure may provide good sensing performance, but may come with the costs of large RS resource utilization and high computational complexity to try all possible BPLs. In the effort to mitigate such costs, several designs of low-cost BM procedure are proposed, including low-cost BM procedure with fixed locations and/or orientations of the transmitter and receiver, low-cost BM procedure with multi-stage sensing, and low-cost BM procedure with RSRP or signal-to-noise ratio (SNR) based BM operations.

Figure 12:
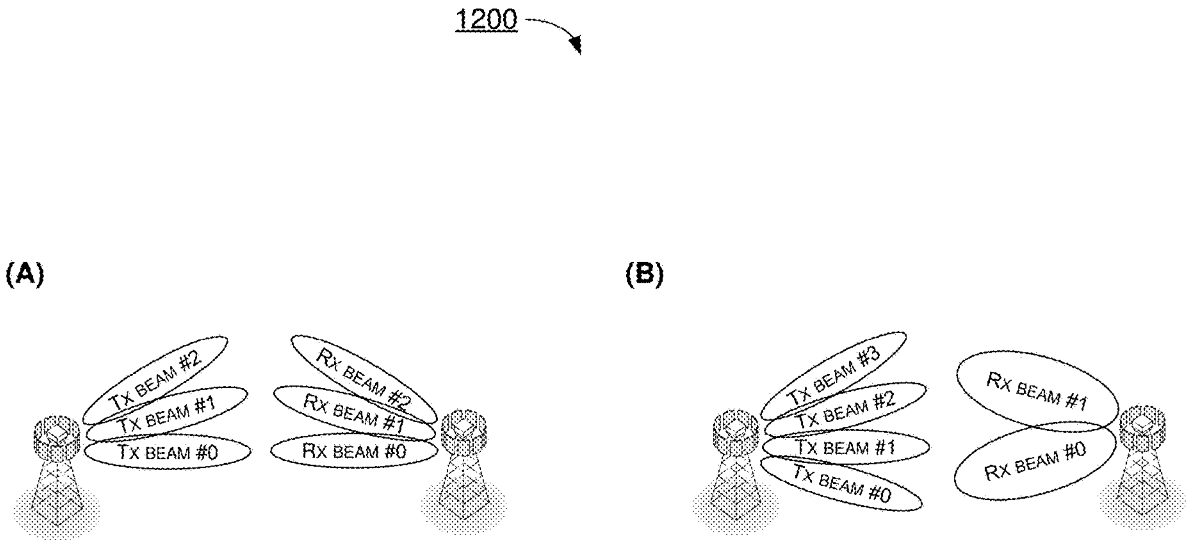
FIG. 12 is a diagram depicting an example scenario of a low-cost BM procedure with fixed locations and orientations of the transmitter and receiver in accordance with an implementation of the present disclosure.

FIG. 12 illustrates an example scenario 1200 of a low-cost BM procedure with fixed locations and orientations of the transmitter and receiver in accordance with an implementation of the present disclosure. Note that sensing operations would be required to be performed on all possible BPLs to cover the whole sensing area (in order to avoid missing targets), if the locations or orientations of the transmitter and the receiver are not fixed (e.g., a UE's location and/or orientation would be variable). Instead, if the locations and orientations of the transmitter and the receiver are fixed (e.g., BS-based bistatic sensing or monostatic sensing), the spatial relations between Tx beams and Rx beams may be established/obtained in advance, such that the receiver may not need to try all Rx beams for each Tx beam. In part (A) of FIG. 12, Rx beams #0~2 correspond to Tx beams #0~2, respectively, since the Rx and Tx beams with the same beam index have the same beam direction and beamwidth. Therefore, the receiver does not need to try Rx beams #1 and #2 for Tx beam #0 since their directions are different. In part (B) of FIG. 12, the receiver may use Rx beam #0 for Tx beams #0 and #1, and use Rx beam #1 for Tx beams #2 and #3, since Tx beam beamwidth and Rx beam beamwidth are different. That is, in this case, the relationship between Tx beams and Rx beams is allowed to be not one-to-one mapping (e.g., one Tx beam corresponding to multiple Rx beams, or one Rx beam corresponding to multiple Tx beams), as long as the paired Tx beams and Rx beams are spatially corresponded. Additionally, the directions and orders of the Tx beams and Rx beams may need to be pre-defined and informed to the transmitter and the receiver. In one example, the transmitter may send signaling to inform the receiver of the angle and beamwidth of each Tx beam, and the receiver may use this information to set the corresponding Rx beam.

Figure 13:
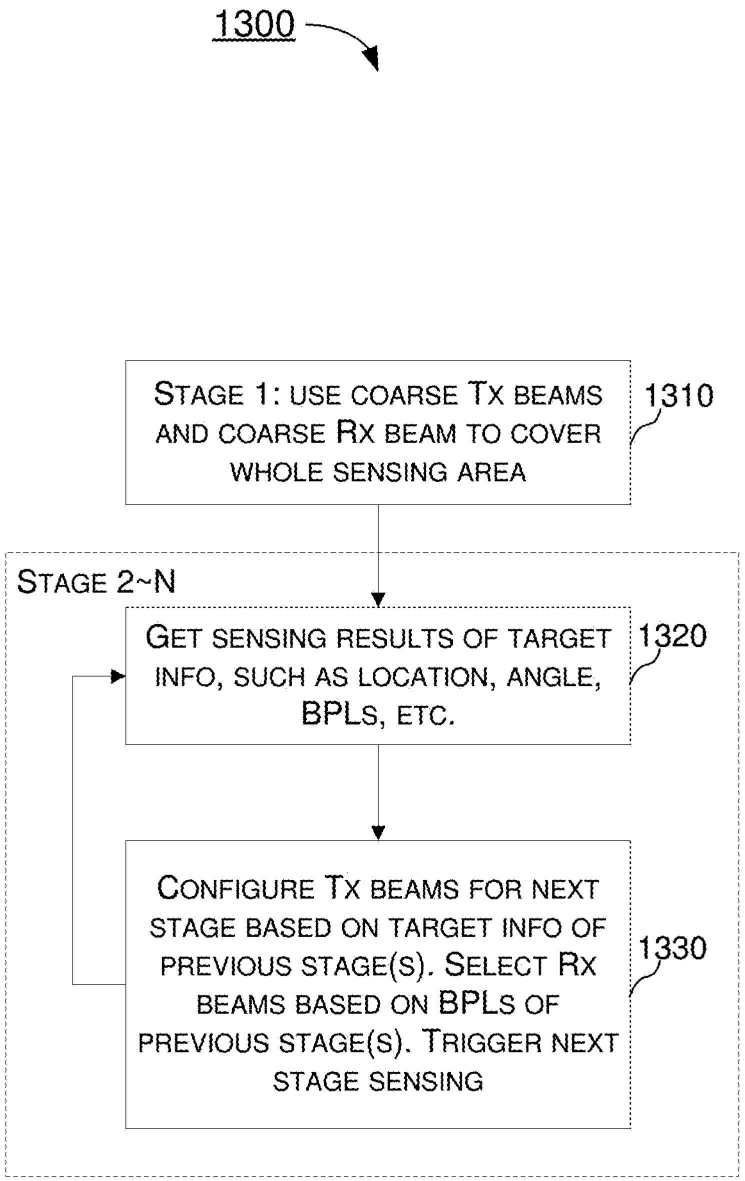
FIG. 13 is a diagram depicting an example flowchart of a low-cost BM procedure with multi-stage sensing in accordance with an implementation of the present disclosure.

FIG. 13 illustrates an example flowchart 1300 of a low-cost BM procedure with multi-stage sensing in accordance with an implementation of the present disclosure. To begin with, at step 1310, coarse Tx beams and coarse Rx beams are used in stage 1 to obtain rough target information (i.e., sensing results regarding location, angle, and BPLs, etc.). Then, in stage 2, based on the sensing results of stage 1 (step 1320), fewer coarse Tx beams and coarse Rx beams are used for target tracking, or fewer fine Tx and fine Rx beams are used for target refining (step 1330). Note that the number of used Tx and Rx beams is fewer in stage 1 since the stage-1 sensing is based on coarse beams (i.e., beams with large beamwidth), and the number of used Tx and Rx beams is also fewer in stage 2 since the stage-2 sensing is based on the rough target information of stage 1. Therefore, RS resource utilization and computational complexity can be reduced, when compared to the case of directly using many Tx and Rx beam sweeping in the single-stage sensing procedure.

Another design of low-cost BM procedure is to insert RSRP-based BM operations to the baseline BM procedure, or replace some stages of the baseline BM procedure. Specifically, the RSRP-based BM operations use L1-RSRP/SNR or target-related-SNR (e.g., sensing SNR) as the metric to try all possible BPLs which cover the whole sensing area. The RSRP-based BM operations are similar to the BM operations in mobile communications, and they can be used to find candidate BPLs which cover sensing targets. Based on the candidate BPLs, the following baseline BM procedure may reduce RS resource utilization and computational complexity (e.g., with fewer configured Tx beams, and known corresponding Rx beam for each Tx beam). More specifically, the RS resource utilization may be reduced due to that the calculation of RSRP/SNR requires fewer symbols (e.g., 1 symbol), and thus, the complexity of RSRP/SNR calculation is lower than that of sensing operation (e.g., 2D-FFT).

It should be noted that the RSRP-based BM operations are based on BM RS which may be different with sensing RS (since it doesn't need multiple symbols for coherent processing), but the present disclosure does not exclude the case of sensing RS and BM RS sharing the same RS (although it may not be the most efficient case). In some implementations, sensing BM RS may be shared with communication BM RS, since their operations are quite similar. In some implementations, sensing BM RS may also be specially configured as an individual RS.

Similar to the BM operations in mobile communications, the RSRP-based BM operations may include P1, P2 and P3 for different purposes. For example, P1 may try all BPLs to find the best BPLs; P2 may fix Rx beam to search the best Tx beam; and P3 may fix Tx beam to search the best Rx beam. Even so, there are still some differences between the RSRP-based BM operations and the BM operations in mobile communications. For some sensing modes (e.g., monostatic sensing, and BS-based bistatic sensing), there may not involve BM RS scheduling and BM results reporting procedure.

Figure 14:
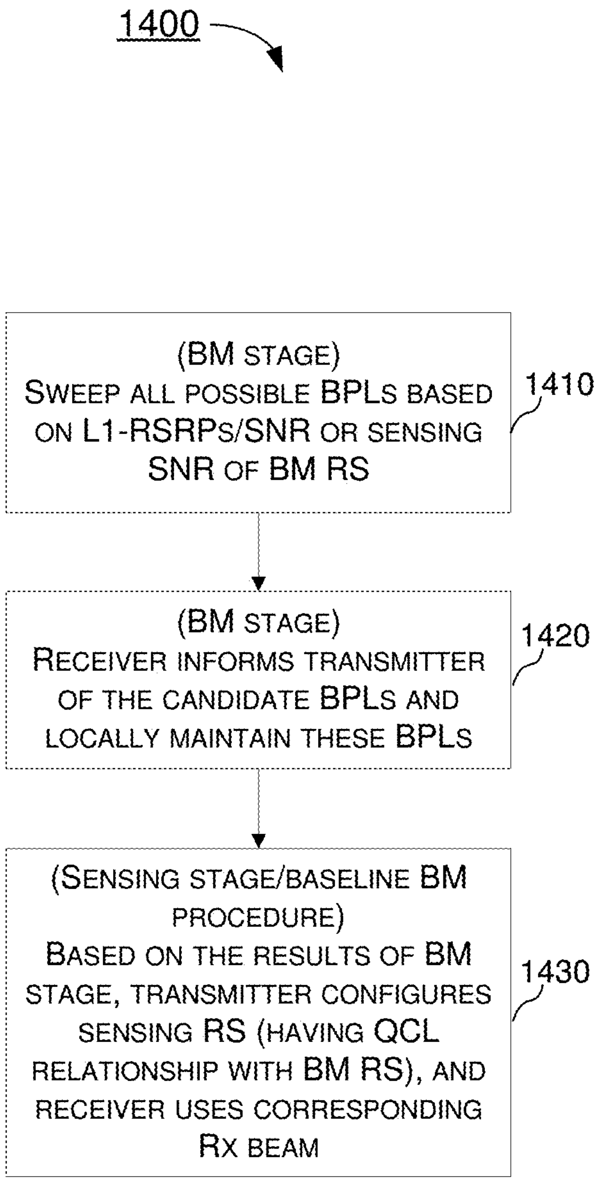
FIG. 14 is a diagram depicting an example flowchart of a low-cost BM procedure with reference signal received power (RSRP)-based BM operations in accordance with an implementation of the present disclosure.

FIG. 14 illustrates an example flowchart 1400 of a low-cost BM procedure with RSRP-based BM operations in accordance with an implementation of the present disclosure. To begin with, at step 1410, the receiver sweeps all possible BPLs to determine the candidate BPLs based on L1-RSRP/SNR or sensing SNR. The candidate BPLs may include the BPLs that may cover targets (e.g., BPLs with sensing SNR>threshold), all BPLs, or the BPLs around the BPL for mobile communications. At step 1420, the receiver informs the transmitter of the candidate BPLs, and locally maintains these BPLs. At step 1430, the transmitter configures sensing RS based on the candidate BPLs, and the receiver uses corresponding Rx beams based on locally maintained BPL information from the BM stage. The configured sensing RS should have a QCL relationship with BM RS (or some of Tx beams) which are used in the BM stage.

Figure 15:
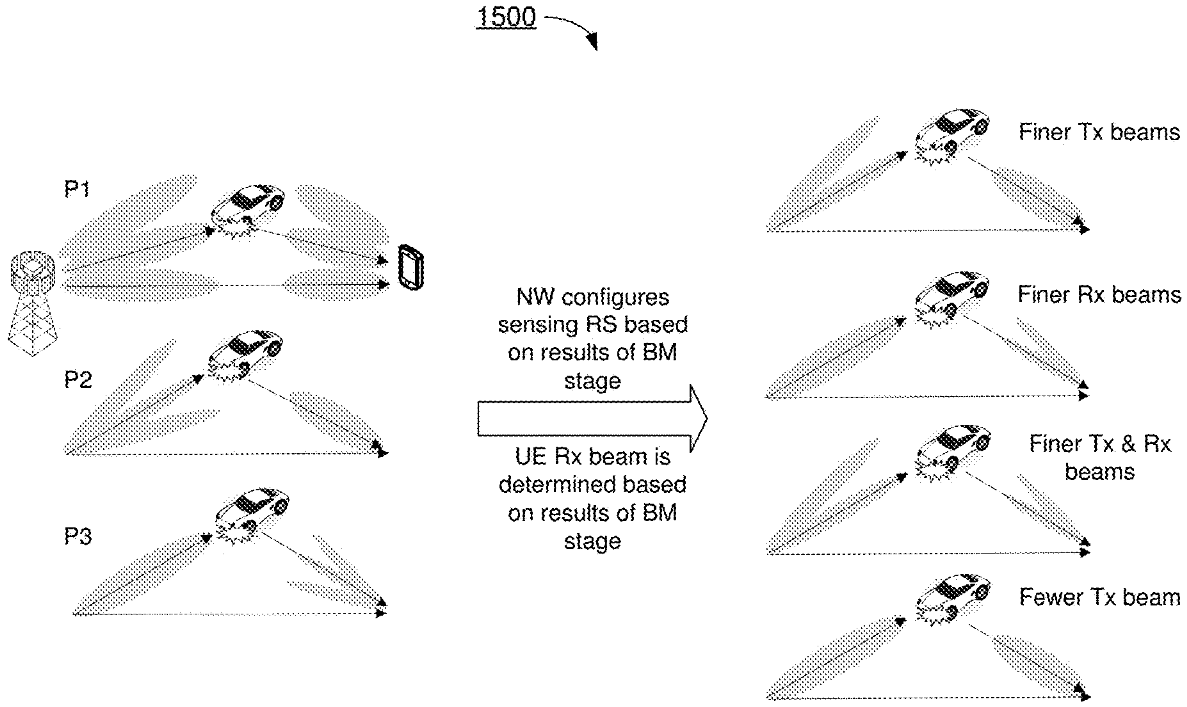
FIG. 15 is a diagram depicting an example scenario of a low-cost BM procedure with RSRP-based BM operations in accordance with an implementation of the present disclosure.

FIG. 15 illustrates an example scenario 1500 of a low-cost BM procedure with RSRP-based BM operations in accordance with an implementation of the present disclosure. Scenario 1500 depicts possible Tx beam configurations and Rx beam settings of the BM stage and the sensing stage during the low-cost BM procedure with RSRP-based BM operations. In RSRP-based BM stage, the RSRP-based BM operations are based on sensing BM RS, e.g., P1/P2/P3 procedure in communication BM operations, where candidate Tx-Rx BPLs, including BPLs that may cover targets (e.g., BPLs with sensing SNR>threshold), or all BPLs, or BPLs around the BPL for mobile communications, are obtained based on L1-RSRP/SNR or target-related-SNR (e.g., sensing SNR), and the receiver informs the transmitter of the candidate BPLs and locally maintains the candidate BPLs. In sensing stage (i.e., baseline BM procedure), the transmitter configures sensing RS based on the result of BM stage (e.g., sensing RS may be configured with fewer Tx beams, or finer Tx beams (within the scope of candidate coarse Tx beams obtained in BM stage, and configured to have QCL relationship with BM RS), while the receiver performs sensing operation on the configured sensing RS based on the locally maintained Rx beams (or finer Rx beams).

Figure 16:
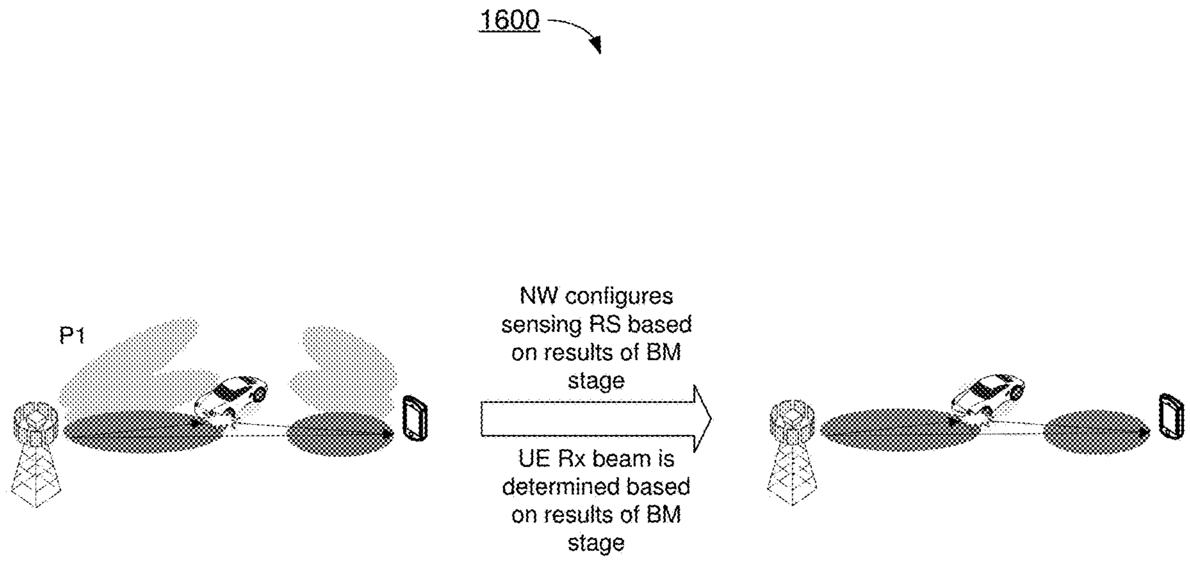
FIG. 16 is a diagram depicting an example scenario of a low-cost BM procedure with RSRP-based BM operations in accordance with another implementation of the present disclosure.

FIG. 16 illustrates an example scenario 1600 of a low-cost BM procedure with RSRP-based BM operations in accordance with another implementation of the present disclosure. Similar to FIG. 15, the RSRP-based BM operations are based on sensing BM RS, except that in scenario 1600, the obtained candidate Tx-Rx BPLs include only the BPLs around the BPL for mobile communications. After the receiver informs the transmitter of the candidate BPLs and locally maintains the candidate BPLs, the transmitter configures sensing RS with fewer Tx and Rx beams, and the receiver performs sensing operation on the configured sensing RS based on the locally maintained Rx beams.

Figure 17:
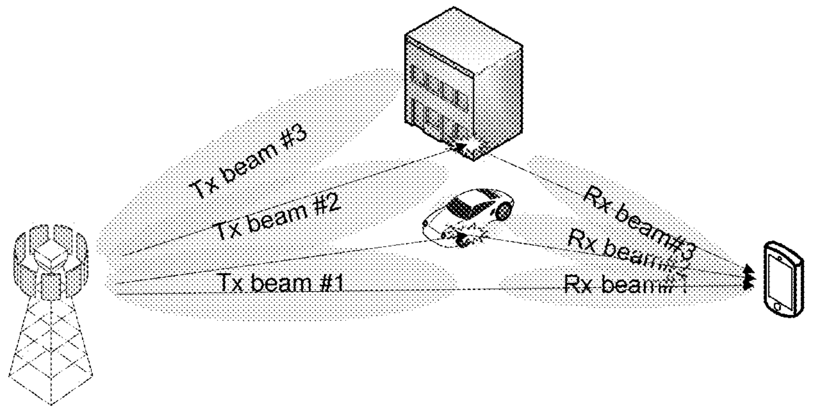
FIG. 17 is a diagram depicting an example scenario of a low-cost BM procedure with RSRP-based BM operations in accordance with another implementation of the present disclosure.

However, using RSRP/SNR as the metric to select the candidate BPLs may have the possibility of missing sensing target. FIG. 17 illustrates an example scenario 1700 of a low-cost BM procedure with RSRP-based BM operations in accordance with another implementation of the present disclosure. In scenario 1700, it is assumed that Line-of-Sight (LoS) and interference clutter are very strong. The strongest 2 BPLs are {Tx beam1, Rx beam1} and {Tx beam2, Rx beam3}, while the best BPLs for target sensing are {Tx beam1, Rx beam2} and {Tx beam2, Rx beam2}. This inconsistency comes from the fact that RSRP/SNR cannot directly indicate the strength of target, especially when LOS and interference clutter are very strong. It will lead to false target (because of strong interference clutter) or missing target (BPL is not optimal and small beamforming gain for sensing). In view of this issue, target-related-SNR (e.g., sensing SNR) may be used instead of RSRP/SNR, as an alternative metric to select the candidate BPLs, since target-related-SNR has removed the impact of LOS and interference clutter. Considering that calculating sensing SNR with fewer RS symbols and low complexity algorithm (like L1-RSRP calculation in comm. BM procedure) may not be an easy task, various design options are proposed below regarding how to incorporate RSRP-based BM operations with baseline BM procedure, or how to replace some operations of baseline BM procedure with RSRP-based BM operations. It should be noted that the concept of P1/P2/P3 (in BM operations for mobile communications) is reused for the RSRP-based BM operations, but the detailed operations may not be identical to P1/P2/P3.

Figure 18:
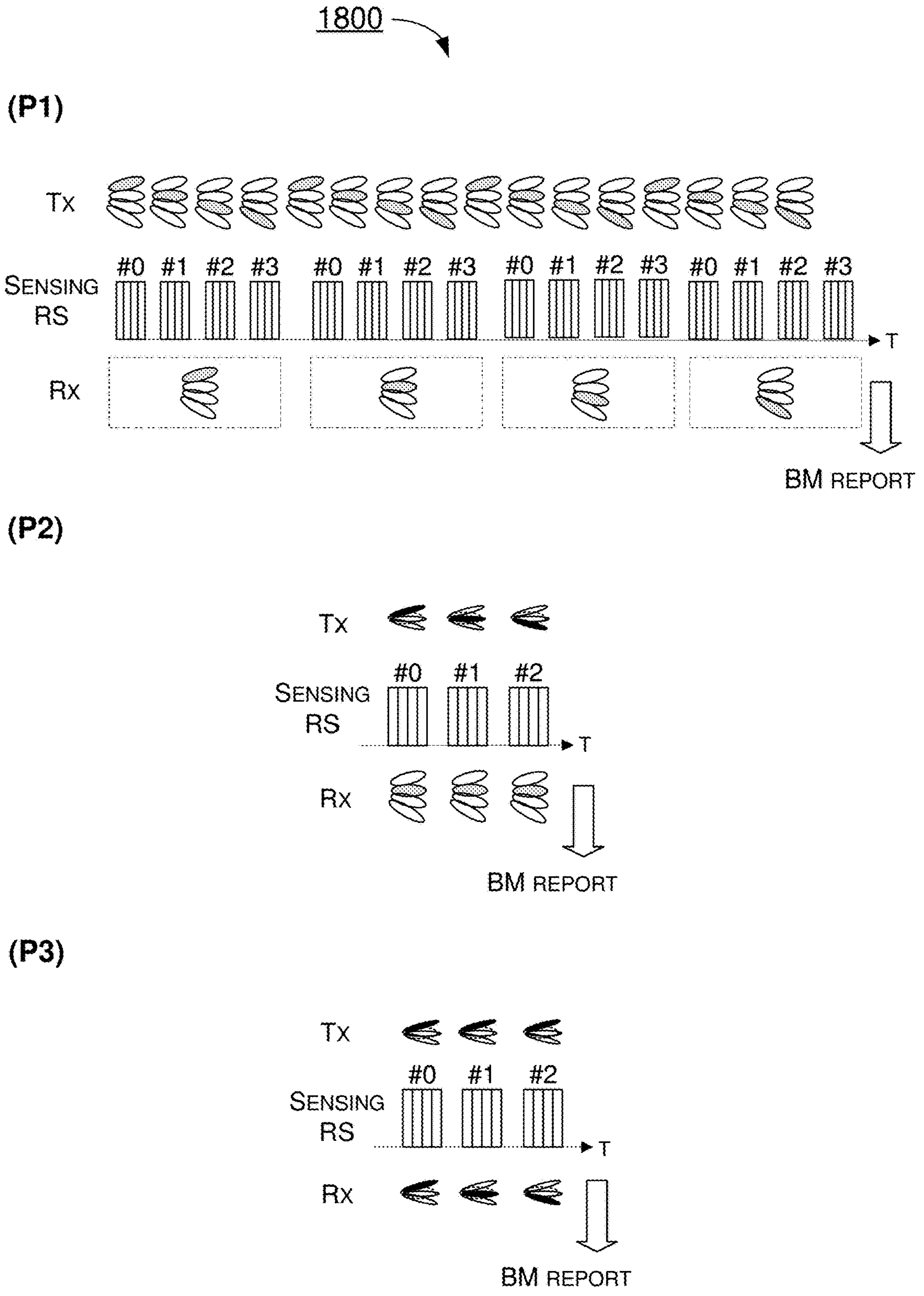
FIG. 18 is a diagram depicting an example scenario of RSRP-based BM operations using P1 to P3 in accordance with an implementation of the present disclosure.

FIG. 18 illustrates an example scenario 1800 of RSRP-based BM operations using P1 to P3 in accordance with an implementation of the present disclosure. In P1, RSRP-based BM operations are based on periodic BM RS, and use 4 coarse Tx beams (1 symbol per Tx beam) and 4 coarse Rx beams. In P2, RSRP-based BM operations are based on aperiodic BM RS, and use 3 fine Tx beams (1 symbol per Tx beam) and 1 coarse Rx beam. In P3, RSRP-based BM operations are based on aperiodic BM RS, and use 1 fine Tx beams (1 symbol per Tx beam) and 3 fine Rx beams.

Figure 19:
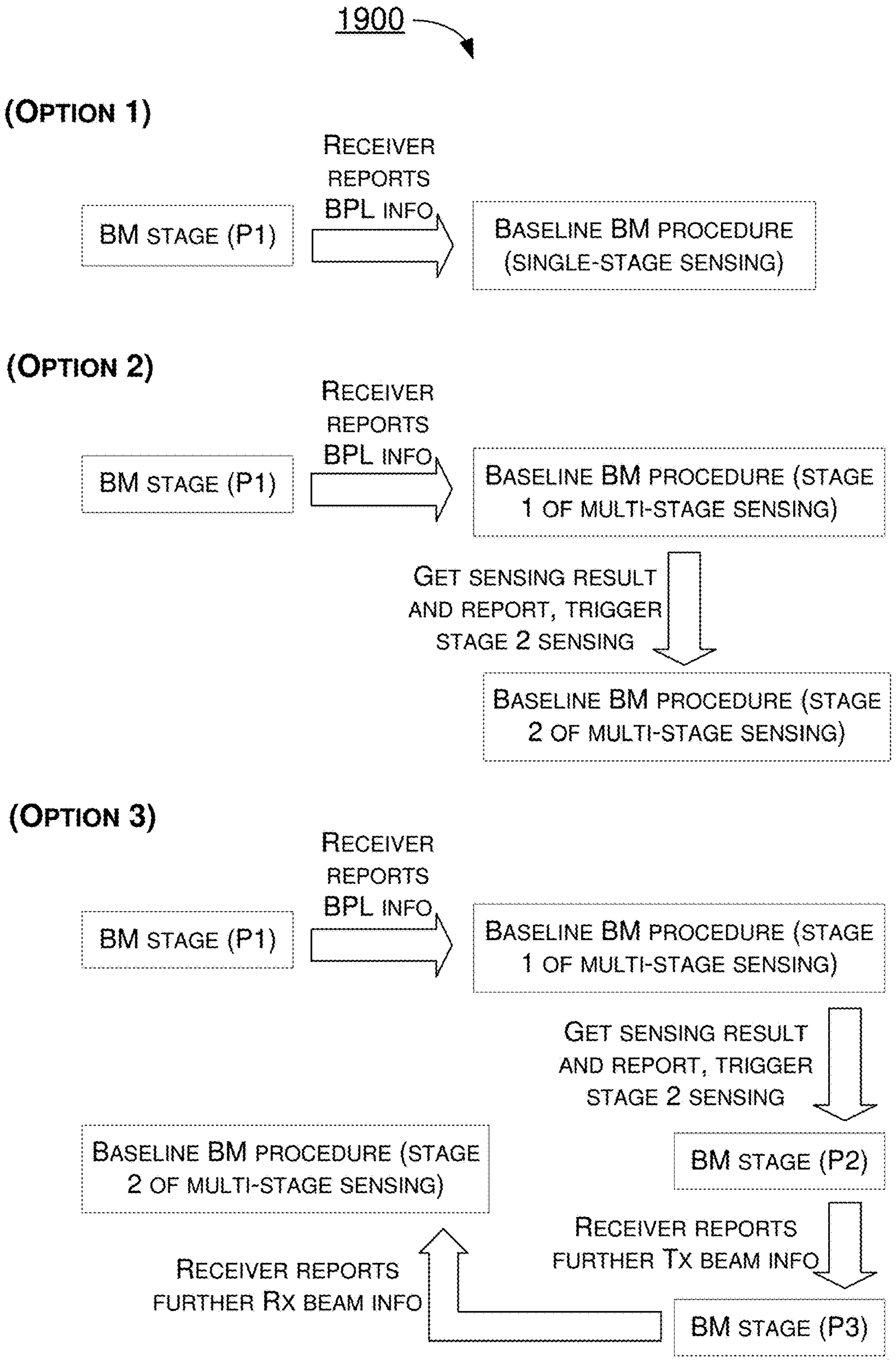
FIG. 19 is a diagram depicting an example scenario of incorporating RSRP-based BM operations with baseline BM procedure in accordance with an implementation of the present disclosure.

FIG. 19 illustrates an example scenario 1900 of incorporating RSRP-based BM operations with baseline BM procedure in accordance with an implementation of the present disclosure. Scenario 1900 depicts options 1 to 3 regarding how to incorporate RSRP-based BM operations with baseline BM procedure, or how to replace some operations of baseline BM procedure with RSRP-based BM operations. In option 1, P1 is used for RSRP-based BM operations which are then incorporated with single-stage sensing of baseline BM procedure. Specifically, after the RSRP-based BM operations, the receiver (e.g., a UE) reports the result of the BM stage, i.e., the BPL information (e.g., N strong Tx beams or all Tx beams), to the transmitter (e.g., a BS), such that the transmitter configures the sensing RS based on the BPL information and the receiver applies Rx beam for corresponding Tx beam based on the BPL information. In option 2, P1 is used for RSRP-based BM operations which are then incorporated with multi-stage sensing (e.g., including stage 1 and stage 2) of baseline BM procedure. Specifically, after the RSRP-based BM operations, the receiver (e.g., a UE) reports the result of the BM stage, i.e., the BPL information (e.g., N strong Tx beams or all Tx beams), to the transmitter (e.g., a BS), and in stage 1 sensing (e.g., for target detection), the transmitter configures sensing RS #1 based on the BPL information and the receiver applies Rx beam for corresponding Tx beam based on the BPL information. Next, after stage 1 sensing, the receiver obtains and reports the sensing results to the transmitter to trigger stage 2 sensing (e.g., for target tracking/refining). In stage 2, the transmitter configures sensing RS #2 based on the reported sensing results (e.g., with finer Tx beams) of stage 1 and the receiver applies Rx beam (e.g., finer Rx beam) for corresponding Tx beam based on the reported sensing results of stage 1. In option 3, P1, P2, and P3 are used for RSRP-based BM operations which are then incorporated with multi-stage sensing (e.g., including stage 1 and stage 2) of baseline BM procedure. Specifically, similar to option 2, P1 is followed by stage 1 sensing which subsequently triggers stage 2 sensing, but before performing stage 2 sensing, P2 and P3 of the RSRP-based BM operations are performed first for the receiver to report further beam information (e.g., finer Tx and Rx beams) to the transmitter. Next, in stage 2, the transmitter configures sensing RS #2 based on the P2 report (e.g., with finer Tx beams) and the receiver applies Rx beam (e.g., finer Rx beam) for corresponding Tx beam based on the P3 report.

Figure 20:
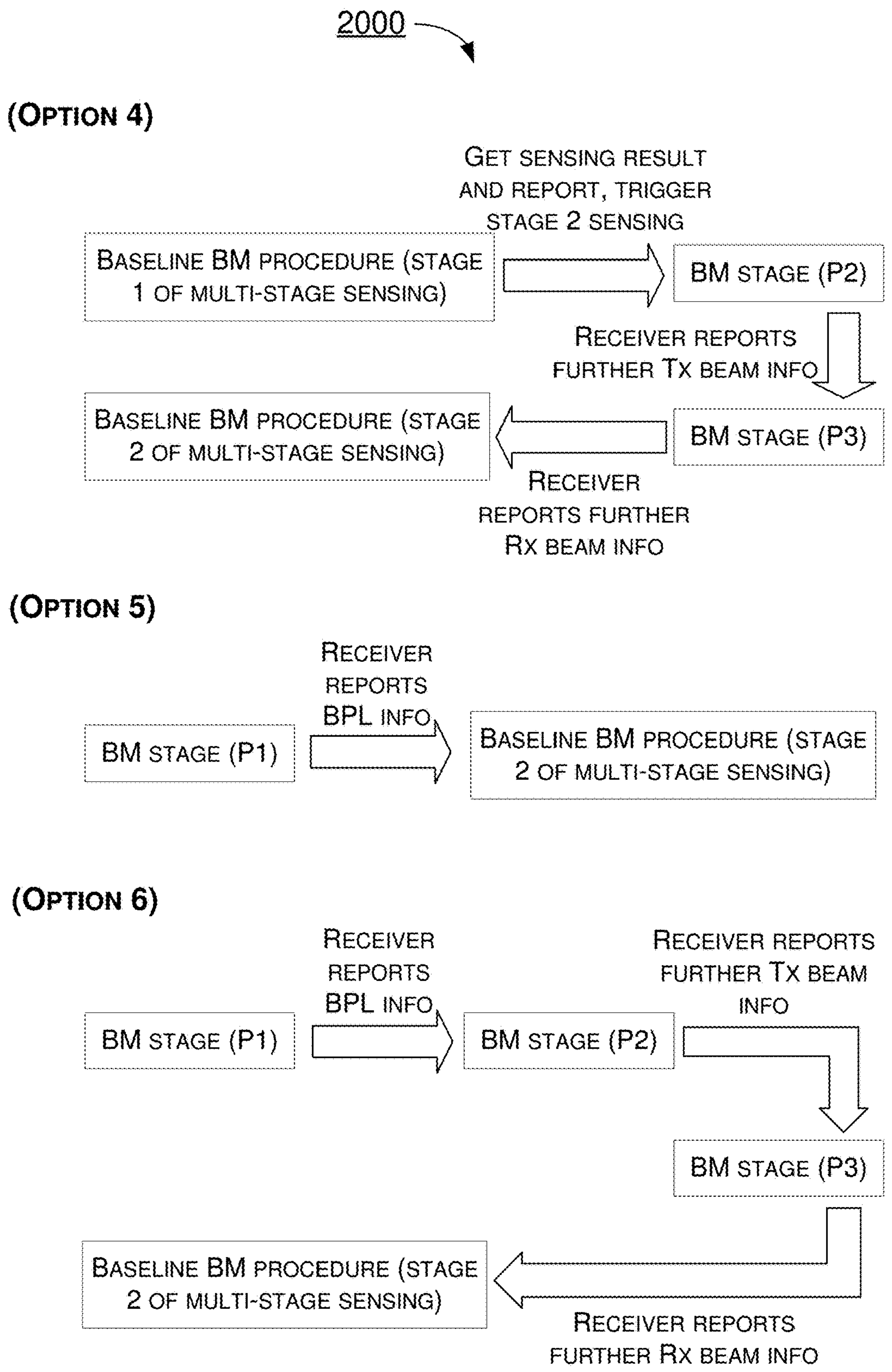
FIG. 20 is a diagram depicting an example scenario of incorporating RSRP-based BM operations with baseline BM procedure in accordance with another implementation of the present disclosure.

FIG. 20 illustrates an example scenario 2000 of incorporating RSRP-based BM operations with baseline BM procedure in accordance with another implementation of the present disclosure. Scenario 2000 depicts options 4 to 6 regarding how to incorporate RSRP-based BM operations with baseline BM procedure, or how to replace some operations of baseline BM procedure with RSRP-based BM operations. In option 4, P2 and P3 are used for RSRP-based BM operations which are then incorporated with multi-stage sensing (e.g., including stage 1 and stage 2) of baseline BM procedure. Specifically, stage 1 sensing is performed in which the transmitter configures sensing RS #1 with all Tx beams to cover the whole sensing area and the receiver sweeps all Rx beams for each Tx beam. After stage 1 sensing, the receiver (e.g., a UE) obtains and reports the sensing results to the transmitter (e.g., a BS) to trigger stage 2 sensing, but before performing stage 2 sensing, P2 and P3 of the RSRP-based BM operations are performed first for the receiver to report further beam information (e.g., finer Tx and Rx beams) to the transmitter. Next, in stage 2, the transmitter configures sensing RS #2 based on the P2 report (e.g., with finer Tx beams) and the receiver applies Rx beam (e.g., finer Rx beam) for corresponding Tx beam based on the P3 report. In option 5, P1 is used for RSRP-based BM operations which are then incorporated with stage 2 of multi-stage sensing of baseline BM procedure. Specifically, after the RSRP-based BM operations, the receiver (e.g., a UE) reports the result of the BM stage, i.e., the BPL information (e.g., N strong Tx beams or all Tx beams), to the transmitter (e.g., a BS), such that the transmitter configures sensing RS #2 based on the BPL information (e.g., with finer Tx beams) and the receiver applies Rx beam (e.g., finer Rx beam) for corresponding Tx beam based on the BPL information. In option 6, P1, P2, and P3 are used for RSRP-based BM operations which are then incorporated with stage 2 of multi-stage sensing of baseline BM procedure. Specifically, P1 is performed in which the receiver reports BPL information (e.g., N strong Tx beams) to the transmitter, P2 is performed in which the receiver reports further Tx beam information (e.g., finer Tx beams) to the transmitter, and P3 is performed in which the receiver reports further Rx beam information (e.g., finer Rx beams) to the transmitter. Next, in stage 2 sensing, the transmitter configures sensing RS #2 based on the P2 report (e.g., with finer Tx beams) and the receiver applies Rx beam (e.g., finer Rx beam) for corresponding Tx beam based on the P3 report.

Under certain schemes in accordance with the present disclosure, a strategy on selecting specific BM procedure based on sensing use cases, channel conditions, and other conditions is proposed. For example, in monostatic sensing, since the Tx beam and Rx beam direction is the same, the number of possible BPLs are smaller than bistatic sensing. As a result, the required RS resource and computational complexity in monostatic sensing will be less than those in bistatic sensing. Accordingly, for monostatic sensing, baseline BM procedure would be more suitable than low-cost BM procedure. Nevertheless, low-cost BM procedure (e.g., staged procedure) may also be applied for monostatic sensing, especially when Tx beam number is large. On the other hand, in bistatic sensing, if the transmitter and the receiver are fixed in location and orientation (e.g., BS-based bistatic sensing), the Tx beams and Rx beams sweeping direction and order may be predefined, so that the transmitter and the receiver may not need to try all possible BPLs. Accordingly, the low-cost BM procedure with fixed locations and orientations of the transmitter and receiver may be applied for such scenario in bistatic sensing. Otherwise, if the transmitter and the receiver are not fixed in location and orientation, another BM procedure may be selected based on other conditions.

The strategy of BM procedure selection may be broken down into the following steps. Step 1 is to collect all related conditions which may impact the selection of BM procedure. Step 2 is to define procedure selection rule, such as performance-first (i.e., a rule prioritizing performance of BM procedure), cost/complexity first (i.e., a rule prioritizing cost/complexity of BM procedure), or performance and cost/complexity tradeoff (i.e., a rule considering the tradeoff between performance and cost/complexity). Step 3 is to select a specific BM procedure based on the rule. Specifically, the specific BM procedure is selected from: (i) baseline BM procedure, (ii) low-cost BM procedure with fixed locations and/or orientations of the transmitter and receiver, (iii) low-cost BM procedure with multi-stage sensing, and (iv) low-cost BM procedure with RSRP/SNR based BM operations.

In some implementations, the related conditions collected in step 1 of the strategy may at least include sensing mode (e.g., monostatic or bistatic), sensing node information (e.g., whether the sensing node is fixed location/orientation or not), target information (e.g., strong or weak target), requirements of different sensing use cases (e.g., periodic/aperiodic, accuracy, resolution, etc.).

An example of these related conditions is provided below in Table 2.

TABLE 2

| Conditions | Impacts |
|---|---|
| Monostatic<br>Bistatic (sensing nodes' location and/or orientation is fixed or not) | Resource cost, computational complexity |

TABLE 2-continued

| Conditions | Impacts |
|---|---|
| Monostatic/bistatic: Tx/Rx BPL sweeping direction can be predefined | |
| Target: strong or weak<br>Strong: target can be detected with RSRP/SNR; or LoS/interference is weak, or can be canceled (separated from target) | Performance (missing target, or fake targe) |
| Periodic or aperiodic sensing<br>Tx and Rx beams number: large or small<br>Small or large sensing area<br>Sub6g or mmWave<br>Number of fine Tx and Rx beams<br>Sensing RS resource: large or small<br>BW (range resolution)<br>1 or more symbols within CPI<br>Sensing requirement: high or low accuracy | Resource cost, computational complexity |

An example of procedure selection for some typical scenarios (e.g., based on the performance-first selection rule) is provided below in Table 3.

TABLE 3

| Typical scenarios | Sensing mode | Selected procedure |
|---|---|---|
| Case 1 (e.g., UAV intrusion detection)<br>Periodic + many beams + strong target + large/small resource | Bistatic sensing | Mixed BM procedure (option 1 & 2 in FIG. 19)<br>Strong target: perf is OK<br>Many beams: need BM to reduce beams number |
| Case 2 (e.g., sub6G target monitoring)<br>Periodic + few beams + strong/weak target + small resource | | Baseline BM procedure<br>Few beams, small resource: small resource/complexity |
| Case 3 (e.g., target tracking)<br>Periodic/aperiodic + fewer beams + strong/weak target + small resource | | Baseline BM procedure<br>Few beams, small resource: small resource/complexity |
| Case 4 (e.g., target refining with fine Tx and Rx beams)<br>Periodic/aperiodic + many beams + strong target + large resource | | Mixed BM procedure (option 1 & 2 in FIG. 19)<br>Strong target: perf is OK<br>Many beams, large resource: need BM to reduce beams number |
| Case 5 (e.g., target tracking)<br>Periodic/aperiodic + fewer beams + strong target + large/small resource | Monostatic sensing | Baseline BM procedure<br>Few beams (Tx and Rx beam directions are the same): small resource/complexity |

Under certain schemes in accordance with the present disclosure, BM-related RRC configuration and MAC-CE/DCI activation/indication signaling corresponding to the aforementioned sensing procedures are proposed. Sensing signals which are used for sensing operations usually refer to sensing RSs. For example, sensing RSs are TDMed with communication signals. Sensing RS may be a cell-specific signal (e.g., synchronization signal block (SSB), tracking reference signal (TRS) in mobile communications, or RS which is specifically designed for sensing), or a UE-specific signal (e.g., new channel state information-reference signal (CSI-RS) for sensing). Network may need to indicate sensing RS (e.g., provide sensing RS configuration) to UE, and inform UE to perform sensing operations.

For BM-related capability reporting, Nfactor=8 is defined in communication, which is a fixed value and implies the number of UE Rx beams (e.g., coarse Rx beams). For sensing, there may be a similar parameter to indicate the number of coarse Rx beams used for sensing. The parameter may be configured with a fixed value which is predefined in 3GPP specifications, or may be configured through RRC signaling. Additionally, or optionally, since sensing area may be changed for different use cases or different sensing stages, the value of the parameter may be reconfigured with different values. Moreover, in the communication BM procedure, a UE reports capability of the number of fine Rx beams to inform a gNB of how many resources are allocated for P3. For sensing, the receiver may report similar capability to inform the transmitter, so as to support the scenarios or sensing stages in which the UE needs to sweep fine Rx beams.

Regarding transmission configuration indicator (TCI) state, for communication BM procedure, all TCI states are in tci-StatesToAddModList of PDSCH-config. Since the purpose of communication is for data reception, PDSCH/PDCCH may be used to identify the Rx beam based on TCI states after BM operations on BM RS. For sensing, as there is no PDSCH/PDCCH reception, all operations are based on sensing RS or sensing BM RS. As such, the framework of communication (e.g., P1, P2, P3 procedure) may be reused for sensing, but without PDSCH/PDCCH reception (indicating TCI state). Additionally, or optionally, a sensing configuration may be provided, which includes TCI state for sensing only, and this sensing configuration may indicate the QCL relationships between sensing RSs and sensing BM RSs (e.g., TCI state includes virtual sensing RS (beam angle, beamwidth), sensing RS, sensing BM RS, or no QCL relationship (source RS)).

Regarding BPL reporting and target information maintenance, unlike communication, the receiver in sensing operations should maintain both the Tx beam and Rx beam (instead of just Tx beam) associated with each target, due to that two targets may be associated with the same Tx beam but with different Rx beams. For RS resource configuration, the receiver may report certain information to inform the transmitter to configure enough RS resource for further target tracking/refining. For example, the reported information may indicate the association between each target and corresponding Tx and Rx beams (e.g., Tx beam 1→target 1→Rx beam 1, Tx beam 1→target 2→Rx beam 2, and Tx beam 3→target 3→Rx beam 3, etc.). Additionally, the receiver may locally maintain the reported information for subsequent sensing operations.

Illustrative Implementations

Figure 21:
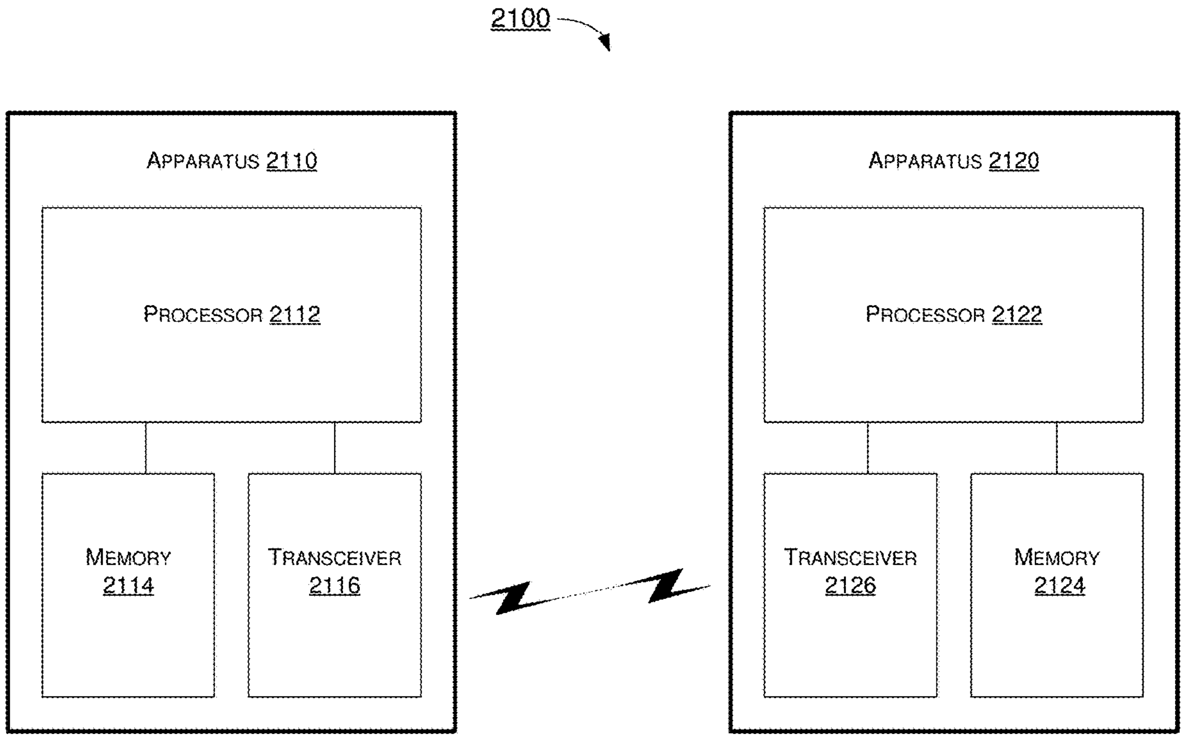
FIG. 21 is a block diagram of an example communication system in accordance with an implementation of the present disclosure.

FIG. 21 illustrates an example communication system 2100 having two example apparatus 2110 and 2120 in accordance with an implementation of the present disclosure. Each of apparatus 2110 and apparatus 2120 may perform various functions to implement schemes, techniques, processes and methods described herein pertaining to wireless sensing in ISAC system (e.g., communication system 2100), including scenarios/schemes described above as well as processes 2200 and 2300 described below.

Each of apparatus 2110 and apparatus 2120 may be a part of an electronic apparatus, which may be a UE such as a portable or mobile apparatus, a wearable apparatus, a wireless communication apparatus or a computing apparatus (e.g., mounted on vehicles). For instance, apparatus 2110/2120 may be implemented in a smartphone, a smartwatch, a personal digital assistant, a digital camera, or a computing equipment such as a tablet computer, a laptop computer or a notebook computer. Each of apparatus 2110 and apparatus 2120 may also be a part of a machine type apparatus, which may be an IoT, NB-IoT, or IIoT apparatus such as an immobile or a stationary apparatus, a home apparatus, a wire communication apparatus or a computing apparatus. For instance, apparatus 2110/2120 may be implemented in a smart thermostat, a smart fridge, a smart door lock, a wireless speaker or a home control center. Alternatively, each of apparatus 2110 and apparatus 2120 may be a part of an electronic apparatus, which may be a network node such as a BS, a small cell, a router or a gateway. For instance, apparatus 2110/2120 may be implemented in an eNB in an LTE, LTE-Advanced or LTE-Advanced Pro network or in a gNB in a 5G, NR, IoT, NB-IoT or IIoT network. Furthermore, each of apparatus 2110 and apparatus 2120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 2110/2120 may include at least some of those components shown in FIG. 21 such as a processor 2112/2122, for example. Apparatus 2110/2120 may further include one or more other components not pertinent to the proposed scheme of the present disclosure (e.g., internal power supply, display device and/or user interface device), and, thus, such component(s) of apparatus 2110/2120 are neither shown in FIG. 21 nor described below in the interest of simplicity and brevity.

In one aspect, each of processor 2112 and processor 2122 may be implemented in the form of one or more single-core processors, one or more multi-core processors, or one or more CISC processors. That is, even though a singular term "a processor" is used herein to refer to processor 2112 and processor 2122, each of processor 2112 and processor 2122 may include multiple processors in some implementations and a single processor in other implementations in accordance with the present disclosure. In another aspect, each of processor 2112 and processor 2122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2112 and processor 2122 is a special-purpose machine specifically designed, arranged and configured to perform specific tasks including wireless sensing between a receiver (e.g., as represented by apparatus 2110) and a transmitter (e.g., as represented by apparatus 2110 in monostatic sensing or apparatus 2120 in bistatic sensing) in accordance with various implementations of the present disclosure.

In some implementations, apparatus 2110 may also include a transceiver 2116 coupled to processor 2112 and capable of wirelessly transmitting and receiving RSs and data signals. In some implementations, transceiver 2116 may be capable of wirelessly communicating with different types of UEs/BSs of different RATs. In some implementations, transceiver 2116 may be equipped with a plurality of antenna ports (not shown) such as, for example, four antenna ports. That is, transceiver 2116 may be equipped with multiple transmit antennas and multiple receive antennas for multiple-input multiple-output (MIMO) wireless communications. In some implementations, apparatus 2120 may also include a transceiver 2126 coupled to processor 2122 and capable of wirelessly transmitting and receiving RSs and data signals. In some implementations, transceiver 2126 may be capable of wirelessly communicating with different types of UEs/BSs of different RATs. In some implementations, transceiver 2126 may be equipped with a plurality of antenna ports (not shown) such as, for example, four antenna ports. That is, transceiver 2126 may be equipped with multiple transmit antennas and multiple receive antennas for MIMO wireless communications. Accordingly, apparatus 2110 and apparatus 2120 may wirelessly communicate with each other directly or indirectly (e.g., by reflection from any target object therebetween) via transceiver 2116 and transceiver 2126, respectively.

In some implementations, apparatus 2110 may further include a memory 2114 coupled to processor 2112 and capable of being accessed by processor 2112 and storing data therein. In some implementations, apparatus 2120 may further include a memory 2124 coupled to processor 2122 and capable of being accessed by processor 2122 and storing data therein. Each of memory 2114 and memory 2124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2114 and memory 2124 may include a type of read-only memory (ROM) such as mask ROM, programmable ROM (PROM), erasable programmable ROM (EPROM) and/or electrically erasable programmable ROM (EEPROM). Alternatively, or additionally, each of memory 2114 and memory 2124 may include a type of non-volatile random-access memory (NVRAM) such as flash memory, solid-state memory, ferroelectric RAM (FeRAM), magnetoresistive RAM (MRAM) and/or phase-change memory.

Each of apparatus 2110 and apparatus 2120 may be a communication entity capable of communicating with each other using various proposed schemes in accordance with the present disclosure. For illustrative purposes and without limitation, a description of operations, functionalities, and capabilities of apparatus 2110, implemented in or as a sensing RS receiver (e.g., a UE or a BS), and apparatus 2120, implemented in or as a sensing RS transmitter (e.g., a UE or a BS), is provided below with processes 2200 and 2300.

Illustrative Processes

Figure 22:
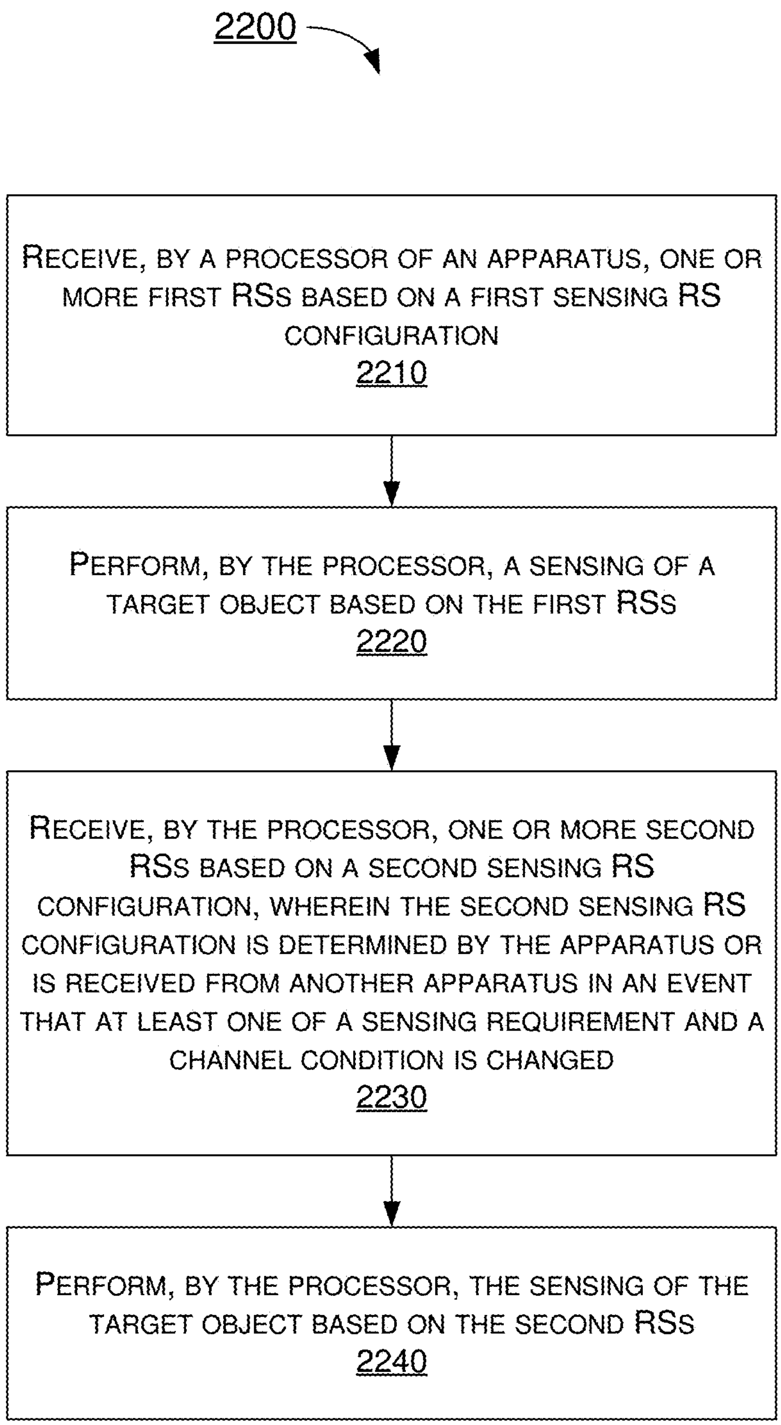
FIG. 22 is a flowchart of an example process in accordance with an implementation of the present disclosure.

FIG. 22 illustrates an example process 2200 in accordance with an implementation of the present disclosure. Process 2200 may be an example implementation of above scenarios/schemes, whether partially or completely, with respect to wireless sensing in ISAC system. Process 2200 may represent an aspect of implementation of features of apparatus 2110. Process 2200 may include one or more operations, actions, or functions as illustrated by one or more of blocks 2210 to 2240. Although illustrated as discrete blocks, various blocks of process 2200 may be divided into additional blocks, combined into fewer blocks, or eliminated, depending on the desired implementation. Moreover, the blocks of process 2200 may be executed in the order shown in FIG. 22 or, alternatively, in a different order. Process 2200 may be implemented by apparatus 2110 or any suitable UE or BS. Solely for illustrative purposes and without limitation, process 2200 is described below in the context of apparatus 2110 as a sensing RS receiver and apparatus 2120 as a sensing RS transmitter. Process 2200 may begin at block 2210.

At 2210, process 2200 may involve processor 2112 of apparatus 2110 receiving, via transceiver 2116, one or more first RSs based on a first sensing RS configuration. Process 2200 may proceed from 2210 to 2220.

At 2220, process 2200 may involve processor 2112 performing, via transceiver 2116, a sensing of a target object based on the first RSs. Process 2200 may proceed from 2220 to 2230.

At 2230, process 2200 may involve processor 2112 receiving, via transceiver 2116, one or more second RSs based on a second sensing RS configuration, wherein the second sensing RS configuration is determined by apparatus 2110 or is received from apparatus 2120 in an event that at least one of a sensing requirement and a channel condition is changed. Process 2200 may proceed from 2230 to 2240.

At 2240, process 2200 may involve processor 2112 performing, via transceiver 2116, the sensing of the target object based on the second RSs.

In some implementations, the sensing requirement may be changed responsive to a sensing purpose switching from target detection to target tracking or refining.

In some implementations, the first RSs or the second RSs may be TDMed, FDMed, or TDMed and FDMed with communication signals; or the first RSs may be TDMed with the communication signals and the second RSs may be FDMed with the communication signals.

In some implementations, in an event that the first RSs are TDMed with the communication signals and the second RSs are FDMed with the communication signals, the first RSs and the communication signals may be allocated on a first CC in a first FR (e.g., FR1 (i.e., sub6G)) and the second RSs may be allocated on a second CC in a second FR (e.g., FR2 (i.e., mmWave)).

In some implementations, process 2200 may further involve processor 2112 performing, via transceiver 2116, a sweeping of a plurality of coarse Rx beams for receiving the first RSs transmitted on each of a plurality of coarse Tx beams. Additionally, the sensing of the target object based on the first RSs may be performed on each sweeping of the coarse Rx beams to obtain a plurality of first sensing results associated with all first BPLs between the coarse Rx beams and the coarse Tx beams, and the sensing of the target object may include integrating the first sensing results to determine information related to the target object.

In some implementations, the information related to the target object may include at least one of: (i) information regarding at least one of a location, a velocity, and an angle of the target object; (ii) information regarding whether an intrusion of the target object is detected within a range; (iii) information regarding whether a respiration of the target object is detected; and (iv) information regarding whether a gesture of the target object is detected.

In some implementations, process 2200 may further involve processor 2112 selecting one of the coarse Rx beams, corresponding to a strongest BPL among the first BPLs, for receiving the second RSs transmitted on each of a plurality of fine Tx beams or on one of the coarse Tx beams, corresponding to the strongest BPL. Additionally, the sensing of the target object based on the second RSs may be performed on the selected coarse Rx beam to obtain a plurality of second sensing results associated with all second BPLs between the selected coarse Rx beam and the fine Tx beams or associated with the strongest BPL, and the sensing of the target object based on the second RSs may include integrating the second sensing results to determine the information related to the target object.

In some implementations, process 2200 may further involve processor 2112 performing, via transceiver 2116, another sweeping of a plurality of fine Rx beams for receiving the second RSs transmitted on each of a plurality of fine Tx beams or on a single one of the coarse Tx beams, corresponding to a strongest BPL among the first BPLs. Additionally, the sensing of the target object based on the second RSs may be performed on each sweeping of the fine Rx beams to obtain a plurality of second sensing results associated with all second BPLs between the fine Rx beams and the fine Tx beams or between the fine Rx beams and the single one coarse Tx beam, and the sensing of the target object may include integrating the second sensing results to determine the information related to the target object.

In some implementations, process 2200 may further involve processor 2112 selecting one or more candidate BPLs from the first BPLs based on the first sensing results. Additionally, the first sensing results may include RSRP or SNR values, the second sensing RS configuration may be determined based on the first sensing results, and the sensing of the target object based on the second RSs may be performed on one or more Rx beams corresponding to or adjacent to the one or more candidate BPLs.

In some implementations, process 2200 may further involve processor 2112 selecting an Rx beam for receiving the first RSs or the second RSs transmitted on a Tx beam of apparatus 2110 or apparatus 2120 based on location information and orientation information of at least one of apparatus 2110 and apparatus 2120. Additionally, the sensing of the target object based on the first RSs or the second RSs may be performed on the selected Rx beam to obtain one or more sensing results, and the sensing of the target object based on the first RSs or the second RSs may include integrating the sensing results to determine information related to the target object.

Figure 23:
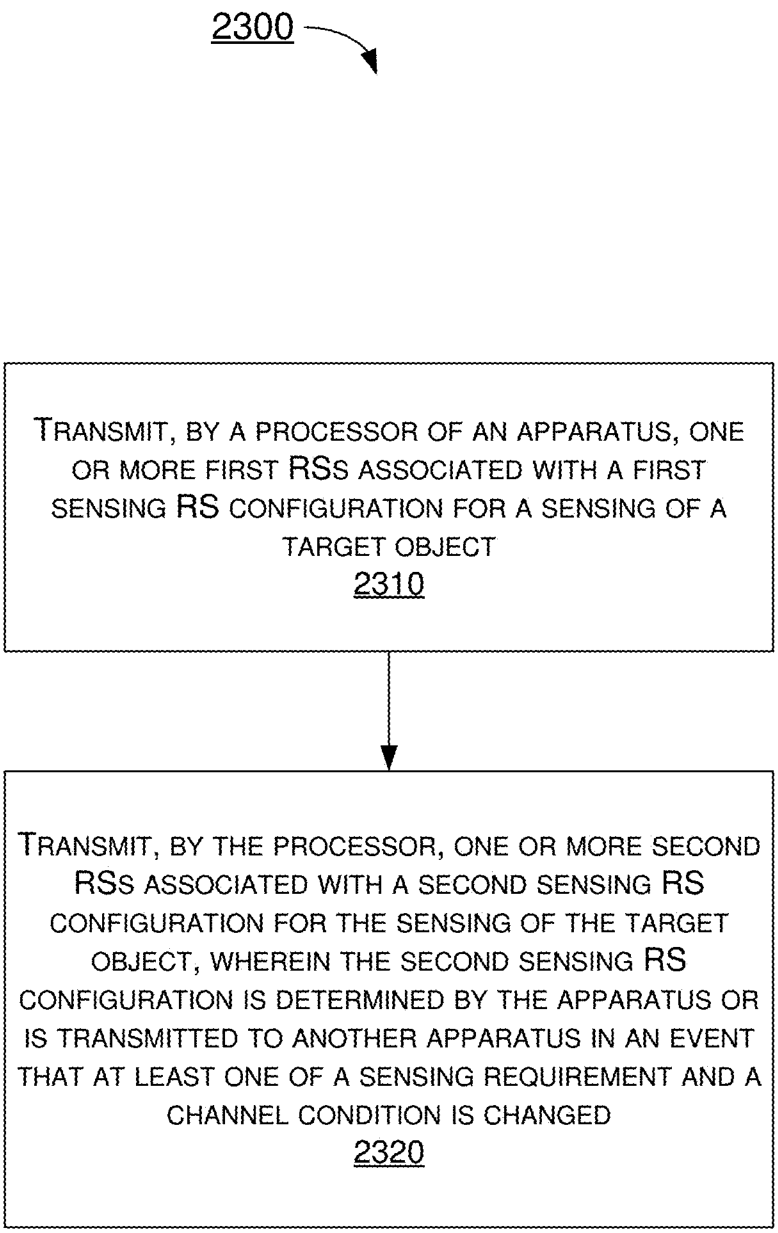
FIG. 23 is a flowchart of another example process in accordance with an implementation of the present disclosure.

FIG. 23 illustrates an example process 2300 in accordance with an implementation of the present disclosure. Process 2300 may be an example implementation of above scenarios/schemes, whether partially or completely, with respect to wireless sensing in ISAC system. Process 2300 may represent an aspect of implementation of features of apparatus 2120. Process 2300 may include one or more operations, actions, or functions as illustrated by one or more of blocks 2310 and 2320. Although illustrated as discrete blocks, various blocks of process 2300 may be divided into additional blocks, combined into fewer blocks, or eliminated, depending on the desired implementation. Moreover, the blocks of process 2300 may be executed in the order shown in FIG. 23 or, alternatively, in a different order. Process 2300 may be implemented by apparatus 2120 or any suitable UE or BS. Solely for illustrative purposes and without limitation, process 2300 is described below in the context of apparatus 2120 as a sensing RS transmitter and apparatus 2110 as a sensing RS receiver. Process 2300 may begin at block 2310.

At 2310, process 2300 may involve processor 2122 of apparatus 2120 transmitting, via transceiver 2126, one or more first RSs associated with a first sensing RS configuration for a sensing of a target object. Process 2300 may proceed from 2310 to 2320.

At 2320, process 2300 may involve processor 2122 transmitting, via transceiver 2126, one or more second RSs associated with a second sensing RS configuration for the sensing of the target object, wherein the second sensing RS configuration is determined by apparatus 2120 or is transmitted to apparatus 2110 in an event that at least one of a sensing requirement and a channel condition is changed.

In some implementations, the sensing requirement may be changed responsive to a sensing purpose switching from target detection to target tracking or refining.

In some implementations, the first RSs or the second RSs may be TDMed, FDMed, or TDMed and FDMed with communication signals; or the first RSs may be TDMed with the communication signals and the second RSs may be FDMed with the communication signals.

In some implementations, in an event that the first RSs are TDMed with the communication signals and the second RSs are FDMed with the communication signals, the first RSs and the communication signals may be allocated on a first CC in a first FR (e.g., FR1 (i.e., sub6G)) and the second RSs may be allocated on a second CC in a second FR (e.g., FR2 (i.e., mmWave)).

In some implementations, process 2300 may further involve processor 2122 performing, via transceiver 2126, a sweeping of a plurality of coarse Tx beams for transmitting the first RSs to be received on each of a plurality of coarse Rx beams.

Additionally, the sensing of the target object based on the first RSs may be performed on each sweeping of the coarse Rx beams to obtain a plurality of first sensing results associated with all first BPLs between the coarse Rx beams and the coarse Tx beams, and the sensing of the target object may include integrating the first sensing results to determine information related to the target object.

In some implementations, the information related to the target object may include at least one of: (i) information regarding at least one of a location, a velocity, and an angle of the target object; (ii) information regarding whether an intrusion of the target object is detected within a range; (iii) information regarding whether a respiration of the target object is detected; and (iv) information regarding whether a gesture of the target object is detected.

In some implementations, process 2300 may further involve processor 2122 selecting one of the coarse Tx beams, corresponding to a strongest BPL among the first BPLs, for transmitting the second RSs to be received on each of a plurality of fine Rx beams or on one of the coarse Rx beams, corresponding to the strongest BPL. Additionally, the sensing of the target object based on the second RSs may be performed on each sweeping of the fine Rx beams or on the one coarse Rx beam to obtain a plurality of second sensing results associated with all second BPLs between the selected coarse Rx beam and the fine Rx beams or associated with the strongest BPL, and the sensing of the target object based on the second RSs may include integrating the second sensing results to determine the information related to the target object.

In some implementations, process 2300 may further involve processor 2122 performing, via transceiver 2126, another sweeping of a plurality of fine Tx beams for transmitting the second RSs to be received on each of a plurality of fine Rx beams or on a single one of the coarse Rx beams, corresponding to a strongest BPL among the first BPLs. Additionally, the sensing of the target object based on the second RSs may be performed on each sweeping of the fine Rx beams to obtain a plurality of second sensing results associated with all second BPLs between the fine Tx beams and the fine Rx beams or between the fine Tx beams and the single one coarse Rx beam, and the sensing of the target object may include integrating the second sensing results to determine the information related to the target object.

In some implementations, process 2300 may further involve processor 2122 selecting one or more candidate BPLs from the first BPLs based on the first sensing results. Additionally, the first sensing results may include RSRP or SNR values, the second sensing RS configuration may be determined based on the first sensing results, and the sensing of the target object based on the second RSs may be performed on one or more Rx beams corresponding to or adjacent to the one or more candidate BPLs.

In some implementations, process 2300 may further involve processor 2122 selecting a Tx beam for transmitting the first RSs or the second RSs to be received on an Rx beam of apparatus 2120 or apparatus 2110 based on location information and orientation information of at least one of apparatus 2120 and apparatus 2110. Additionally, the sensing of the target object based on the first RSs or the second RSs may be performed on the Rx beam to obtain one or more sensing results, and the sensing of the target object based on the first RSs or the second RSs may include integrating the sensing results to determine information related to the target object.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as “a” or “an,” e.g., “a” and/or “an” should be interpreted to mean “at least one” or “one or more;” the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of “two recitations,” without other modifiers, means at least two recitations, or two or more recitations. Furthermore, in those instances where a convention analogous to “at least one of A, B, and C, etc.” is used, in general such a construction is intended in the sense one having skill in the art would understand the convention, e.g., “a system having at least one of A, B, and C” would include but not be limited to systems that have A alone, B alone, C alone, A and B together, A and C together, B and C together, and/or A, B, and C together, etc. In those instances where a convention analogous to “at least one of A, B, or C, etc.” is used, in general such a construction is intended in the sense one having skill in the art would understand the convention, e.g., “a system having at least one of A, B, or C” would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.”

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

performing, by a processor of an apparatus, a sweeping of a plurality of coarse receiving (Rx) beams for receiving one or more first reference signals (RSs) based on a first sensing RS configuration;

performing, by the processor, a sensing of a target object based on the first RSs, wherein the sensing of the target object based on the first RSs is performed on each sweeping of the coarse Rx beams to obtain a plurality of first sensing results associated with all first beam pair links (BPLs) between the coarse Rx beams and the coarse Tx beams, and the sensing of the target object comprises integrating the first sensing results to determine information related to the target object;

selecting, by the processor, one of the coarse Rx beams, corresponding to a strongest BPL among the first BPLs, for receiving one or more second RSs based on a second sensing RS configuration, wherein the second sensing RS configuration is determined by the apparatus or is received from another apparatus in an event that at least one of a sensing requirement and a channel condition is changed, and wherein the second RSs are transmitted on each of a plurality of fine Tx beams or on one of the coarse Tx beams, corresponding to the strongest BPL; and performing, by the processor, the sensing of the target object based on the second RSs, wherein the sensing of the target object based on the second RSs is performed on the selected coarse Rx beam to obtain a plurality of second sensing results associated with all second BPLs between the selected coarse Rx beam and the fine Tx beams or associated with the strongest BPL, and the sensing of the target object based on the second RSs comprises integrating the second sensing results to determine the information related to the target object.

2. The method of claim 1, wherein the sensing requirement is changed responsive to a sensing purpose switching from target detection to target tracking or refining.

3. The method of claim 1, wherein the first RSs or the second RSs are time-division multiplexed (TDMed), frequency-division multiplexed (FDMed), or TDMed and FDMed with communication signals; or the first RSs are TDMed with the communication signals and the second RSs are FDMed with the communication signals.

4. The method of claim 3, wherein in an event that the first RSs are TDMed with the communication signals and the second RSs are FDMed with the communication signals, the first RSs and the communication signals are allocated on a first component carrier (CC) in a first frequency range (FR) and the second RSs are allocated on a second CC in a second FR.

5. The method of claim 1, wherein the information related to the target object comprises at least one of:

information regarding at least one of a location, a velocity, and an angle of the target object;

information regarding whether an intrusion of the target object is detected within a range;

information regarding whether a respiration of the target object is detected; and information regarding whether a gesture of the target object is detected.

6. The method of claim 1, further comprising:

performing, by the processor, another sweeping of a plurality of fine Rx beams for receiving the second RSs transmitted on each of a plurality of fine Tx beams or on a single one of the coarse Tx beams, corresponding to a strongest BPL among the first BPLS, wherein the sensing of the target object based on the second RSs is performed on each sweeping of the fine Rx beams to obtain a plurality of second sensing results associated with all second BPLs between the fine Rx beams and the fine Tx beams or between the fine Rx beams and the single one coarse Tx beam, and the sensing of the target object comprises integrating the second sensing results to determine the information related to the target object.

7. The method of claim 1, further comprising:

selecting, by the processor, one or more candidate BPLs from the first BPLs based on the first sensing results, wherein the first sensing results comprise reference signal received power (RSRP) or signal-to-noise ratio (SNR) values, the second sensing RS configuration is determined based on the first sensing results, and the sensing of the target object based on the second RSs is performed on one or more Rx beams corresponding to or adjacent to the one or more candidate BPLs.

8. The method of claim 1, further comprising:

selecting, by the processor, an Rx beam for receiving the first RSs or the second RSs transmitted on a Tx beam of the apparatus or another apparatus based on location information and orientation information of at least one of the apparatus and the other apparatus, wherein the sensing of the target object based on the first RSs or the second RSs is performed on the selected Rx beam to obtain one or more sensing results, and the sensing of the target object based on the first RSs or the second RSs comprises integrating the sensing results to determine information related to the target object.

9. A method, comprising:

performing, by a processor of an apparatus, a sweeping of a plurality of coarse receiving (Tx) beams for transmitting one or more first reference signals (RSs) associated with a first sensing RS configuration for a sensing of a target object, wherein the first RSs are transmitted to be received on each of a plurality of coarse receiving (Rx) beams, and the sensing of a target object based on the first RSs is performed on each sweeping of the coarse Rx beams to obtain a plurality of first sensing results associated with all first beam pair links (BPLs) between the coarse Rx beams and the coarse Tx beams, and the sensing of the target object comprises integrating the first sensing results to determine information related to the target object;

selecting, by the processor, one of the coarse Tx beams, corresponding to a strongest BPL among the first BPLs, for transmitting one or more second RSs associated with a second sensing RS configuration for the sensing of the target object, wherein the second sensing RS configuration is determined by the apparatus or is transmitted to another apparatus in an event that at least one of a sensing requirement and a channel condition is changed, and wherein the second RSs are transmitted on each of a plurality of fine Tx beams or on one of the coarse Tx beams, corresponding to the strongest BPL, and the sensing of the target object based on the second RSs is performed on each sweeping of the fine Rx beams or on the one coarse Rx beam to obtain a plurality of second sensing results associated with all second BPLs between the selected coarse Tx beam and the fine Rx beams or associated with the strongest BPL, and the sensing of the target object based on the second RSs comprises integrating the second sensing results to determine the information related to the target object.

10. The method of claim 9, wherein the sensing requirement is changed responsive to a sensing purpose switching from target detection to target tracking or refining.

11. The method of claim 9, wherein the first RSs or the second RSs are time-division multiplexed (TDMed), frequency-division multiplexed (FDMed), or TDMed and FDMed with communication signals; or the first RSs are TDMed with the communication signals and the second RSs are FDMed with the communication signals.

12. The method of claim 11, wherein in an event that the first RSs are TDMed with the communication signals and the second RSs are FDMed with the communication signals, the first RSs and the communication signals are allocated on a first component carrier (CC) in a first frequency range (FR) and the second RSs are allocated on a second CC in a second FR.

13. The method of claim 9, wherein the information related to the target object comprises at least one of:

information regarding at least one of a distance, a velocity, and an angle of the target object;

information regarding whether an intrusion of the target object is detected within a range;

information regarding whether a respiration of the target object is detected; and information regarding whether a gesture of the target object is detected.

14. The method of claim 9, further comprising:

performing, by the processor, another sweeping of a plurality of fine Tx beams for transmitting the second RSs to be received on each of a plurality of fine Rx beams or on a single one of the coarse Rx beams, corresponding to a strongest BPL among the first BPLs;

wherein the sensing of the target object based on the second RSs is performed on each sweeping of the fine Rx beams to obtain a plurality of second sensing results associated with all second BPLs between the fine Tx beams and the fine Rx beams or between the fine Tx beams and the single one coarse Rx beam, and the sensing of the target object comprises integrating the second sensing results to determine the information related to the target object.

15. The method of claim 9, further comprising:

selecting, by the processor, one or more candidate BPLs from the first BPLs based on the first sensing results, wherein the first sensing results comprise reference signal received power (RSRP) or signal-to-noise ratio (SNR) values, the second sensing RS configuration is determined based on the first sensing results, and the sensing of the target object based on the second RSs is performed on one or more Rx beams corresponding to or adjacent to the one or more candidate BPLs.

16. An apparatus, comprising:

a transceiver which, during operation, wirelessly transmits and receives signals; and a processor communicatively coupled to the transceiver such that, during operation, the processor performs operations comprising:

performing, via the transceiver, a sweeping of a plurality of coarse receiving (Rx) beams for receiving one or more first reference signals (RSs) based on a first sensing RS configuration;

performing a sensing of a target object based on the first RSs, wherein the sensing of the target object based on the first RSs is performed on each sweeping of the coarse Rx beams to obtain a plurality of first sensing results associated with all first beam pair links (BPLs) between the coarse Rx beams and the coarse Tx beams, and the sensing of the target object comprises integrating the first sensing results to determine information related to the target object;

selecting one of the coarse Rx beams, corresponding to a strongest BPL among the first BPLs, for receiving, via the transceiver, one or more second RSs based on a second sensing RS configuration, wherein the second sensing RS configuration is determined by the apparatus or is received from another apparatus in an event that at least one of a sensing requirement and a channel condition is changed, and wherein the second RSs are transmitted on each of a plurality of line Tx beams or on one of the coarse Tx beams, corresponding to the strongest BPL; and performing the sensing of the target object based on the second RSs, wherein the sensing of the target object based on the second RSs is performed on the selected coarse Rx beam to obtain a plurality of second sensing results associated with all second BPLs between the selected coarse Rx beam and the fine Tx beams or associated with the strongest BPL, and the sensing of the target object based on the second RSs comprises integrating the second sensing results to determine the information related to the target object.

* * * * *